US009216538B2

(12) United States Patent
Borchardt

(10) Patent No.: US 9,216,538 B2
(45) Date of Patent: Dec. 22, 2015

(54) INCREMENTALLY STRETCHED FILMS WITH ENHANCED PROPERTIES AND METHODS FOR MAKING THE SAME

(75) Inventor: Michael G. Borchardt, Naperville, IL (US)

(73) Assignee: The Glad Products Company, Oakland, CA (US)

( * ) Notice: Subject to any disclaimer, the term of this patent is extended or adjusted under 35 U.S.C. 154(b) by 524 days.

(21) Appl. No.: 13/190,677

(22) Filed: Jul. 26, 2011

(65) Prior Publication Data

US 2013/0028542 A1 Jan. 31, 2013

Related U.S. Application Data

(63) Continuation-in-part of application No. 13/189,772, filed on Jul. 25, 2011, now Pat. No. 8,865,289.

(51) Int. Cl.

| | |
|---|---|
| *B65D 30/00* | (2006.01) |
| *B65D 30/02* | (2006.01) |
| *B65D 33/00* | (2006.01) |
| *B29C 55/18* | (2006.01) |
| *B65D 33/02* | (2006.01) |
| *B29C 55/02* | (2006.01) |
| *B29C 55/06* | (2006.01) |
| *B29C 55/08* | (2006.01) |

(52) U.S. Cl.
CPC .............. *B29C 55/18* (2013.01); *B65D 33/00* (2013.01); *B65D 33/02* (2013.01); *B29C 55/023* (2013.01); *B29C 55/06* (2013.01); *B29C 55/08* (2013.01); *Y10T 428/1345* (2015.01); *Y10T 428/2457* (2015.01)

(58) Field of Classification Search
CPC ...................................................... B65D 33/00
USPC ........ 383/71, 72, 75, 118; 428/156, 163, 167; 264/288.4, 290.2
See application file for complete search history.

(56) References Cited

U.S. PATENT DOCUMENTS

| | | | |
|---|---|---|---|
| 4,116,892 A | | 9/1978 | Schwarz |
| 4,258,166 A | * | 3/1981 | Canterino et al. .......... 526/348.1 |
| 4,374,690 A | * | 2/1983 | Canterino et al. ............. 156/229 |
| 6,605,172 B1 | * | 8/2003 | Anderson et al. ............. 156/199 |
| 6,952,510 B1 | | 10/2005 | Karlsen et al. |
| 2002/0003910 A1 | * | 1/2002 | Jackson .......................... 383/75 |
| 2002/0105110 A1 | * | 8/2002 | Dobrin et al. ................. 264/154 |
| 2005/0178493 A1 | * | 8/2005 | Broering et al. ............... 156/197 |
| 2006/0093766 A1 | * | 5/2006 | Savicki et al. ................ 428/35.2 |
| 2008/0178768 A1 | | 7/2008 | Breese |
| 2008/0233375 A1 | | 9/2008 | Wright et al. |
| 2009/0233041 A1 | | 9/2009 | Rasmussen |
| 2010/0040875 A1 | * | 2/2010 | Patel et al. .................... 428/338 |
| 2010/0098354 A1 | * | 4/2010 | Fraser et al. .................... 383/72 |
| 2011/0117307 A1 | * | 5/2011 | Fraser et al. ................. 428/66.6 |

\* cited by examiner

*Primary Examiner* — Jes F Pascua
*Assistant Examiner* — Nina Attel
(74) *Attorney, Agent, or Firm* — Thomas C. Feix

(57) ABSTRACT

Methods of enhancing one or more physical properties of a thermoplastic film include incrementally stretching thermoplastic films in the machine direction and/or transverse direction. In one or more implementations, methods of incrementally stretching thermoplastic films include reducing the gauge of the films without reducing the films' machine-direction tear resistance. The methods can involve cold stretching the films and imparting rib patterns into the film. The linear ribs can have alternating thick and thin gauges. Incrementally stretched thermoplastic films can have a machine-direction tear resistance that is approximately equal to or greater than the machine-direction tear resistance of the film prior to stretching.

14 Claims, 17 Drawing Sheets

INCREMENTALLY STRETCHED FILMS WITH ENHANCED PROPERTIES AND METHODS FOR MAKING THE SAME

CROSS-REFERENCE TO RELATED APPLICATIONS

The present invention is a continuation in part application of prior U.S. patent application Ser. No. 13/189,772, filed Jul. 25, 2011, entitled "Incrementally Stretched Films with Increased Tear Resistance and Methods for Making the Same," the entire content of which is incorporated by reference herein.

BACKGROUND OF THE INVENTION

1. The Field of the Invention

The present invention relates generally to thermoplastic films. Specifically, the invention relates to incrementally-stretched thermoplastic films with enhanced physical properties, and to methods of incrementally stretching thermoplastic films to enhance physical properties thereof.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength of a thermoplastic film. The tensile strength of a thermoplastic film is the maximum stress that a film can withstand while being stretched before it fails. Another strength parameter that manufacturers may want to increase or otherwise control is tear resistance. The tear resistance of a thermoplastic film is the amount of force required to propagate or enlarge a tear that has already been created in a film. Still further, a manufacturer may want to increase or otherwise control a film's impact resistance.

One way manufacturers may attempt to control or change the material properties of a thermoplastic film is by stretching the film. Common directions of stretching include "machine direction" and "transverse direction" stretching. As used herein, the term "machine direction" refers to the direction along the length of the film, or in other words, the direction of the film as the film is formed during extrusion and/or coating. As used herein, the term "transverse direction" refers to the direction across the film or perpendicular to the machine direction.

Common ways of stretching film in the machine direction include machine direction orientation ("MDO") and incremental stretching. MDO involves stretching the film between two pairs of smooth rollers. Commonly MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

To increase the MD tensile strength of a thermoplastic film, manufacturers commonly heat the film to an elevated temperature and stretch the film in the machine direction. If a film is not stretched by the correct amount, the tensile strength of the film may not increase. Commonly, manufacturers seeking to increase the tensile strength of a film will stretch the thermoplastic film between approximately 300 to 500 percent of the film's original length or more. Unfortunately, stretching thermoplastic films in the machine direction using conventional methods results in a reduction in the film's MD tear resistance, and a reduction in the film's overall puncture resistance.

One common use of thermoplastic films is as bags for liners in trash or refuse receptacles. It is desirable to have trash bags with a high tear resistance to help prevent tearing of the trash bag and associated spilling of the contents during disposal thereof. Another common use of thermoplastic films is as flexible plastic bags for storing food items. Similar to trash bags, a high tear resistance in food storage bags can help prevent tearing of the bags and associated spilling or spoiling of food.

Accordingly, there are a number of considerations to be made in thermoplastic films and manufacturing methods.

BRIEF SUMMARY OF THE INVENTION

Implementations of the present invention solve one or more problems in the art with apparatus and methods for enhancing the physical properties of thermoplastic films by incrementally stretching the films. In particular, one or more implementations of the present invention include MD and/or TD incrementally-stretched films, and products formed therewith, that have maintained or increased physical properties despite a reduction in gauge. Additionally, one or more implementations of the present invention include methods of incrementally-stretching films in the machine and/or transverse directions, while maintaining or increasing one or more of the films' physical properties.

For example, one implementation of an incrementally-stretched thermoplastic film formed by stretching an un-stretched thermoplastic film can include a thermoplastic material. The film can include a ribbed pattern of thicker and thinner linear ribs extending across the incrementally-stretched thermoplastic film. The film can have a machine direction tear resistance that is approximately equal to or greater than a first machine direction tear resistance of the un-stretched thermoplastic film. The film can also have a gauge by weight that is approximately equal to or less than a first gauge by weight of the un-stretched thermoplastic film.

Additionally, an implementation of a thermoplastic bag can include first and second sidewalls including an incrementally-stretched film formed by stretching an un-stretched film. The bag can also include a first set of alternating thicker and thinner linear ribs extending across the first side wall in the transverse direction. The bag can further include a second set of alternating thicker and thinner linear ribs extending across the first side wall in the machine. The first sidewall can have a machine direction tear resistance that is approximately equal to or greater than a first machine direction tear resistance of the un-stretched thermoplastic film.

In addition to the forgoing, a method of enhancing one or more physical properties of a thermoplastic film can involve providing a film of a thermoplastic material with a first MD tear resistance and a first gauge by weight. Additionally, the method can involve cold machine-direction ring rolling the film and cold transverse-direction ring rolling the film. The machine-direction and transverse-direction ring rolled film can have a second machine-direction tear resistance that is equal to or greater than the first machine-direction tear resistance. Furthermore, the machine-direction and transverse-direction ring rolled film can have a second gauge by weight that is less than about 0.95 times the first gauge by weight.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
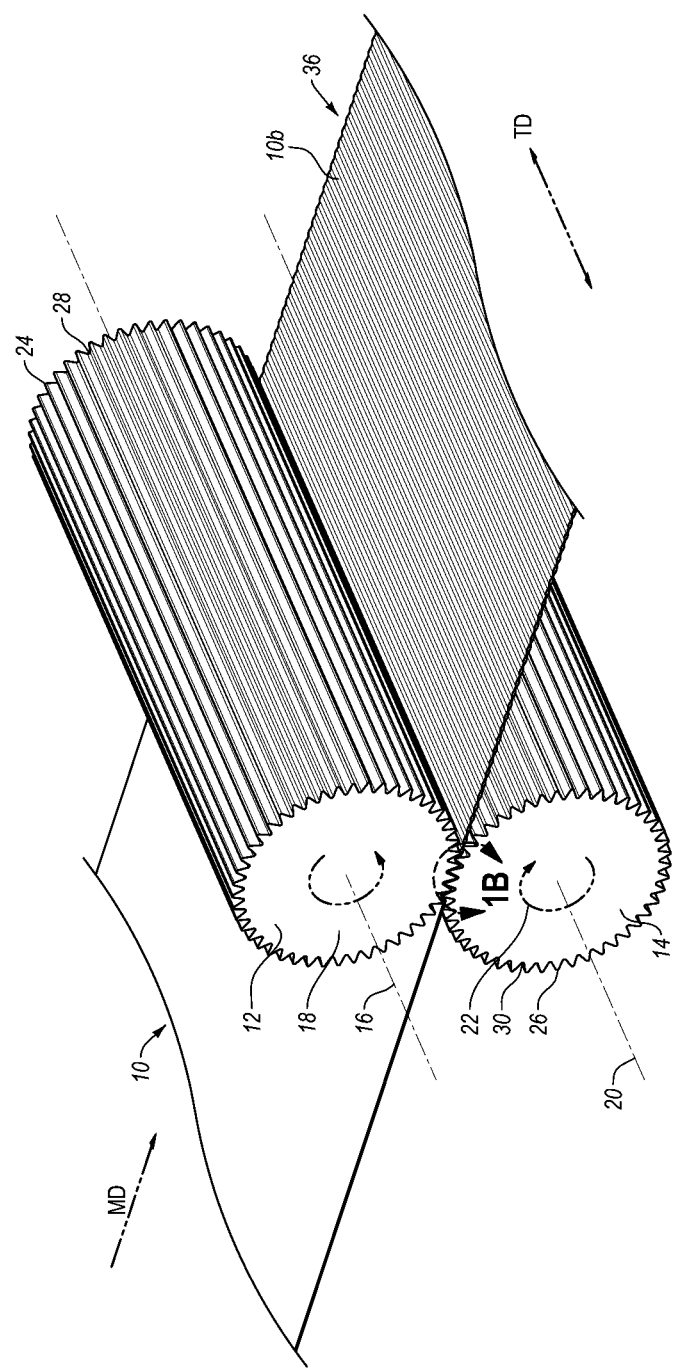
FIG. 1A illustrates a schematic diagram of a thermoplastic film being incrementally stretched by MD intermeshing rollers in accordance with one or more implementations of the present invention.

One or more implementations of the present invention include apparatus and methods for enhancing the physical properties of thermoplastic films by incrementally stretching the films. In particular, one or more implementations of the present invention include MD and/or TD incrementally-stretched films, and products formed therewith, that have maintained or increased physical properties despite a reduction in gauge. Additionally, one or more implementations of the present invention include methods of incrementally-stretching films in the machine and/or transverse directions, while maintaining or increasing one or more of the films' physical properties.

Indeed, one or more implementations can provide thermoplastic films, and products made there from, with reduced gauge yet maintained or increased tear resistance. Thus, one or more implementations can reduce the material needed to produce a product without compromising important material properties, such as tear and puncture resistance. One will appreciate in light of the disclosure herein that such material reductions can provide significant cost savings.

In addition to the foregoing, one or more implementations provide stretched thermoplastic films with physical features that consumers can associate with the improved strength properties. In particular, one or more implementations include thermoplastic films with ribs extending across the film in the transverse and/or machine directions. The ribs can notify a consumer that the thermoplastic film has been processed to increase the strength of the film.

Some consumers may associate thinner films with decreased strength. Indeed, such consumers may feel that they are receiving less value for their money when purchasing thermoplastic film products with smaller gauges. In one or more implementations, a consumer may not readily detect that one or more incrementally stretched films of the present invention have a reduced gauge. In particular, a consumer may associate the thickness of the thermoplastic film with the thicker ribs of an alternating pattern of thick and thin ribs.

As alluded to previously, one or more implementations include methods of incrementally stretching a film in the machine and/or transverse directions with the unexpected result of maintaining or increasing the tear resistance, or other properties, of the film. In particular, as will be described in greater detail below, one or more implementations provide synergistic effects when incrementally cold-stretching thermoplastic films in the machine and/or transverse directions. The films of the present invention can undergo one or more film stretching processes under ambient or cold (non-heated) conditions.

Implementations of the present invention that include cold ring-rolling differ significantly from most conventional processes that stretch films under heated conditions. Stretching under ambient or cold conditions in accordance with one or more implementations can constrain the molecules in the film so they are not as easily oriented as under heated conditions. This, in combination with determining the amount of stretch based on one or more of the polymer type, the starting gauge, and the blow up ratio, can provide the unexpected result of maintaining or increasing the MD tear resistance, or other properties of the film, despite a reduction in gauge.

Film Materials

As explained in greater detail below, the amount of incremental stretching to achieve the unexpected result of maintaining or increasing the MD tear resistance, or other properties of the film, can be based, at least in part, on the thermoplastic material of the film being stretched. As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

Indeed, implementations of the present invention can include any flexible or pliable thermoplastic material which may be formed or drawn into a web or film. Furthermore, the thermoplastic materials may include a single layer or multiple layers. Examples of multilayered films suitable for use with one or more implementations of the present invention include coextruded multilayered films, multiple films continuously laminated together, and multiple films partially or discontinuously laminated together. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to the foregoing, one will appreciate in light of the disclosure herein that manufacturers may form the films or webs to be used with the present invention using a wide variety of techniques. For example, a manufacturer can form the films using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos.

4,814,135; 4,857,600; 5,076,988; 5,153,382, each of which are incorporated herein by reference. Examples of various extruders, which can be used in producing the films to be used with the present invention, can be a single screw type modified with a blown film die, an air ring, and continuous take off equipment.

In a blown film process, the die can be an upright cylinder with an annular opening. Rollers can pull molten plastic upward away from the die. An air-ring can cool the film as the film travels upwards. An air outlet can force compressed air into the center of the extruded annular profile, creating a bubble. The air can expand the extruded circular cross section by a multiple of the die diameter. This ratio is called the "blow-up ratio" (BUR). As explained in greater detail below, in one or more implementations, the amount of incremental stretching to achieve the unexpected result of maintaining or increasing the MD tear resistance or other properties of the film can be based, at least in part, on the BUR.

Additionally or alternatively, in one or more implementations the amount of incremental stretching to maintain or increase the MD tear resistance or other properties of the film can be based, at least in part, on the starting gauge of the film being stretched. As used herein, the term "starting gauge" or "initial gauge" refers to the average distance between the major surfaces of a film before it is incrementally stretched. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations may vary along the length and/or width of the film.

Figure 1B:
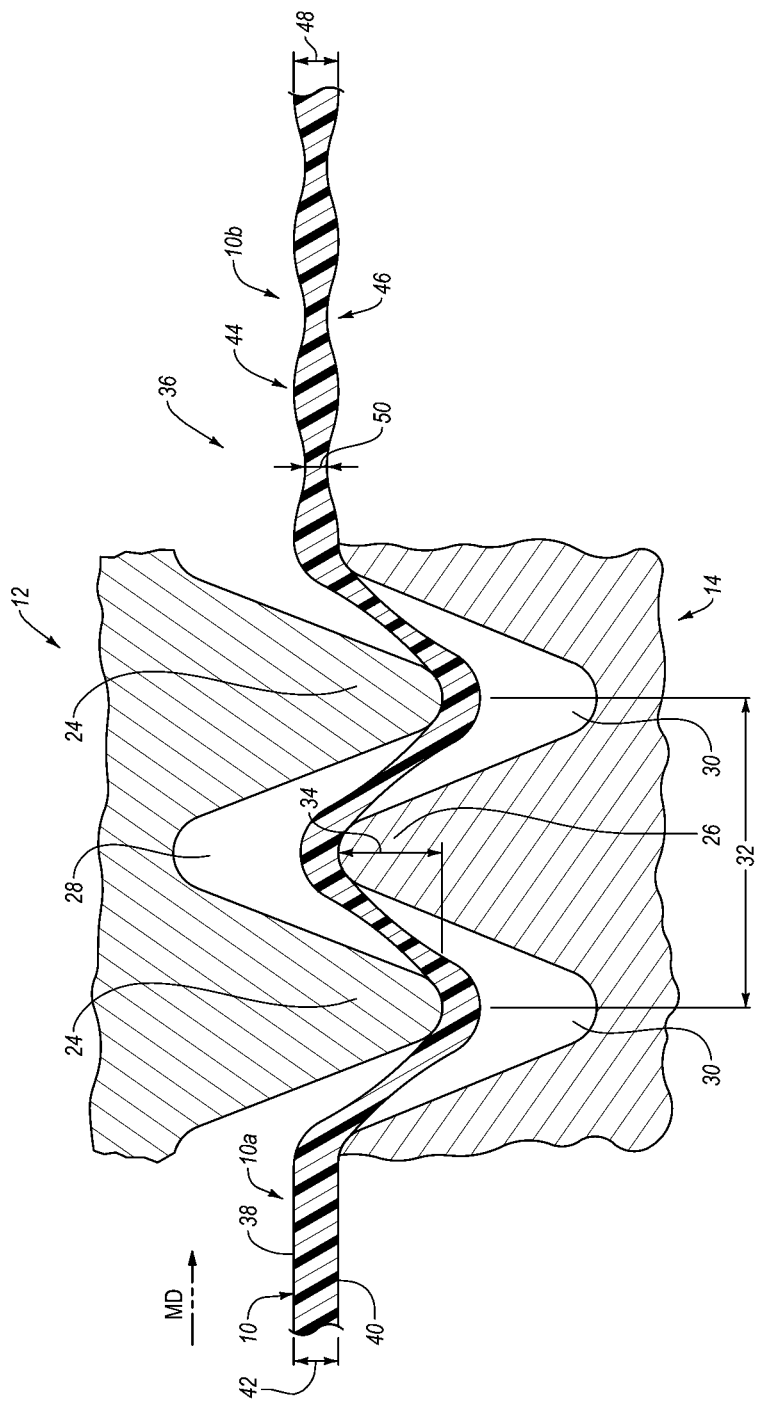
FIG. 1B illustrates an enlarged view of a portion of the thermoplastic film passing through the MD intermeshing rollers of FIG. 1A taken along the circle 1B of FIG. 1A.

Referring now to the Figures, FIGS. 1A and 1B illustrate one exemplary process of incrementally stretching a thermoplastic film in the machine direction in accordance with an implementation of the present invention. In particular, FIGS. 1A and 1B illustrate an MD ring rolling process that incrementally stretches a thermoplastic film 10 by passing the film 10 through a pair of MD intermeshing rollers 12, 14. As explained in greater detail below, the MD ring rolling processes of the present invention can stretch the film 10 in the machine direction, while maintaining or increasing the MD tear resistance or other properties of the film 10.

As shown by the FIGS. 1A and 1B, the first roller 12 and the second roller 14 can each have a generally cylindrical shape. The MD intermeshing rollers 12, 14 may be made of cast and/or machined metal, such as, steel, aluminum, or any other suitable material. The MD intermeshing rollers 12, 14 can rotate in opposite direction about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22. The axes of rotation 16, 20 can be parallel to the transverse direction and perpendicular to the machine direction.

The MD intermeshing rollers 12, 14 can closely resemble fine pitch spur gears. In particular, the MD intermeshing rollers 12, 14 can include a plurality of protruding ridges 24, 26. The ridges 24, 26 can extend along the MD intermeshing rollers 12, 14 in a direction generally parallel to axes of rotation 16, 20. Furthermore, the ridges 24, 26 can extend generally radially outward from the axes of rotation 16, 20.

The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. FIGS. 1A and 1B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the MD intermeshing rollers 12, 14 intermesh. Similarly, the grooves 30 of the second roller 14 can receive the ridges 24 of the first roller 12. In one or more implementations, the ridges 24, 26 will not contact each other or transmit rotational torque during an intermeshing stretching operation.

One will appreciate in light of the disclosure herein that the configuration of the ridges 24, 26 and grooves 28, 30 can prevent contact between ridges 24, 26 during intermeshing. Additionally, the configuration of the ridges 24, 26 and grooves 28, 30 can dictate the amount of stretching caused by the MD intermeshing rollers 12, 14.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching created by the MD intermeshing rollers 12, 14. As shown by FIG. 1B, the pitch 32 is the distance between the tips of two adjacent ridges on the same roller. The "depth of engagement" (DOE) 34 is the amount of overlap between ridges 24, 26 of the different MD intermeshing rollers 12, 14 during intermeshing. The ratio of DOE 34 to pitch 32 can determine, at least in part, the amount of stretch imparted by a pair of MD intermeshing rollers 12, 14.

As shown by FIG. 1A, the direction of travel of the film 10 through the MD intermeshing rollers 12, 14 is parallel to the machine direction and perpendicular to the transverse direction. As the thermoplastic film 10 passes between the MD intermeshing rollers 12, 14, the ridges 24, 26 can incrementally stretch the film 10 in the machine direction. In some implementations, stretching the film 10 in the machine direction can reduce the gauge of the film and increase the length of the film 10. In other implementations, the film 10 may rebound after being stretched such that the gauge of the film 10 is not decreased. Furthermore, in some implementations, stretching the film 10 in the machine direction can reduce the width of the film 10. For example, as the film 10 is lengthened in the machine direction, the film's length can be reduced in the transverse direction.

In particular, as the film 10 proceeds between the MD intermeshing rollers 12, 14, the ridges 24 of the first roller 12 can push the film 10 into the grooves 30 of the second roller 14 and vice versa. The pulling of the film 10 by the ridges 24, 26 can stretch the film 10. The MD intermeshing rollers 12, 14 may not stretch the film 10 evenly along its length. Specifically, the rollers 12, 14 can stretch the portions of the film 10 between the ridges 24, 26 more than the portions of the film 10 that contact the ridges 24, 26. Thus, the MD intermeshing rollers 12, 14 can impart or form a ribbed pattern 36 into the film 10. As used herein, the terms "impart" and "form" refer to the creation of a desired structure or geometry in a film upon stretching the film that will at least partially retain the desired structure or geometry when the film is no longer subject to any strains or externally applied forces.

As shown in FIGS. 1A and 1B, the ribbed pattern 36 formed by the MD ring rolling process can be visually perceivable. As used herein, the term "visually perceivable" refers to features that are readily discernible to the normal naked eye. In particular, visually perceivable features can be readily discernible to the normal naked eye when a film 10 including the features is subjected to normal use.

In one or more implementations, prior to passing through the MD intermeshing rollers 12, 14, the film 10 may not include a visually perceivable ribbed pattern. For example, FIGS. 1A and 1B illustrate that the un-stretched film 10 (i.e., the film that is yet to pass through the intermeshing rollers 12, 14) can have a substantially flat top surface 38 and substantially flat bottom surface 40. The un-stretched film 10 can have an initial thickness or starting gauge 42 extending between its major surfaces (i.e., the top surface 38 and the bottom surface 40). In at least one implementation, the starting gauge 42 can be substantially uniform along the length of the un-stretched film 10.

For purposes of the present invention, the un-stretched film 10 need not have an entirely flat top surface 38. Indeed, the top surface 38 can be rough or uneven. Similarly, bottom surface 40 of the un-stretched film 10 can also be rough or uneven. Further, the starting gauge 42 need not be consistent or uniform throughout the entirety of un-stretched film 10. Thus, the starting gauge 42 can vary due to intentional product design, manufacturing defects, tolerances, or other processing inconsistencies.

FIGS. 1A and 1B illustrate the MD intermeshing rollers 12, 14 can process the un-stretched film 10 into an MD incrementally-stretched film 10b. As previously mentioned, the MD incrementally-stretched film 10b can include a ribbed pattern 36. The ribbed pattern 36 can include alternating series of thicker sections or ribs 44 and thinner sections or ribs 46. The thicker ribs 44 can comprise "un-stretched" regions and the thinner ribs 46 can comprise stretched regions. In one or more implementations, the thicker ribs 44 regions of the incrementally-stretched films may be stretched to a small degree. In any event, the thicker ribs 44 are stretched less compared to the thinner ribs 46. The ribs 44, 46 can extend across the MD incrementally-stretched film 10b in the transverse direction.

The thicker ribs 44 can have a first average thickness or gauge 48. The first average gauge 48 can be approximately equal to the starting gauge 42. In one or more implementations, the first average gauge 48 can be less than the starting gauge 42. The thinner ribs 46 can have a second average thickness or gauge 50. The second average gauge 50 can be less than both the starting gauge 42 and the first average gauge 48.

One will appreciate in light of the disclosure herein that the ribbed pattern 36 may vary depending on the method used to incrementally stretch the film 10. To the extent that MD ring rolling is used to incrementally stretch the film 10, the ribbed pattern 36 on the film 10 can depend on the pitch 32 of the ridges 24, 26, the DOE 34, and other factors. In some implementations, the molecular structure of the thermoplastic material of the film 10 may be rearranged to provide this shape memory.

Figure 2:
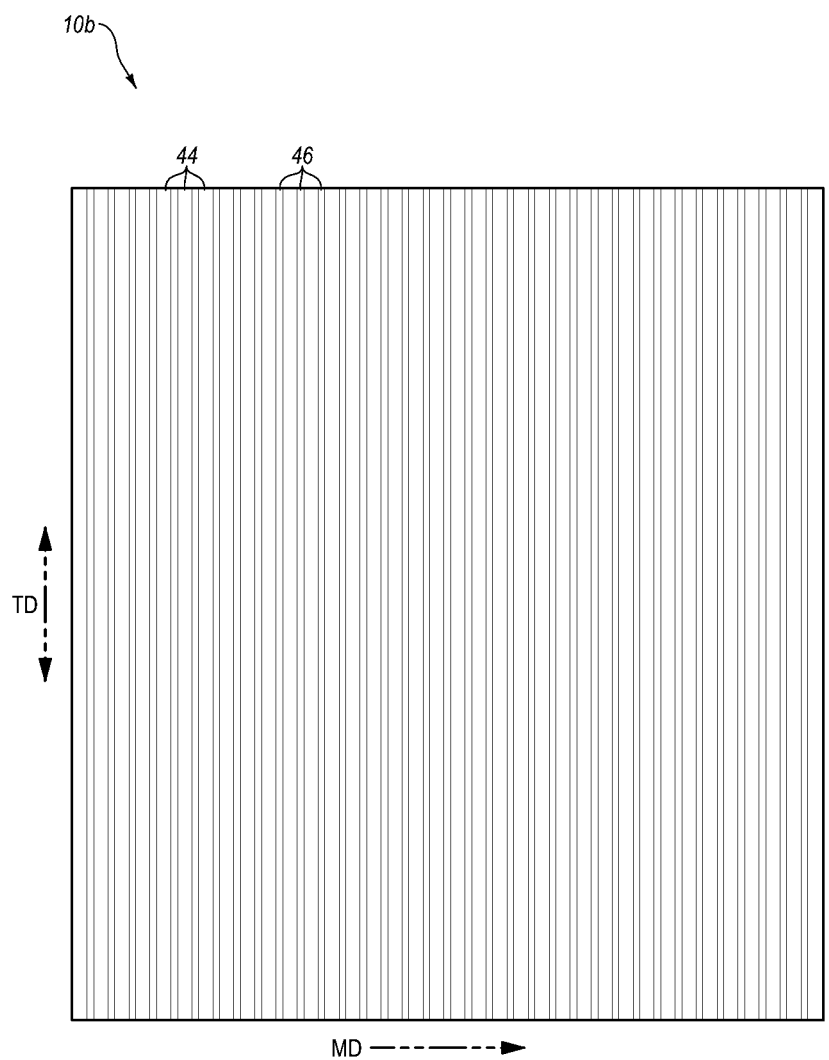
FIG. 2 illustrates a view of a thermoplastic film with enhanced physical properties created by the MD intermeshing rollers of FIG. 1A.

FIG. 2 illustrates a top view of the MD incrementally-stretched film 10b. The ribs 44, 46 can extend across the film 10b in a direction transverse (i.e., transverse direction) to a direction in which the film was extruded (i.e., machine direction). As shown by FIG. 2, ribs 44, 46 can extend across the entire length of the film 10b. The pitch 32 and the DOE 34 of the ridges 24, 26 of the MD intermeshing rollers 12, 14 can determine the width and spacing of the ribs 44, 46. Thus, as explained in greater detail below, by varying the pitch 32 and/or DOE 34, the width and/or spacing of the ribs 44, 46, the amount of stretching the film undergoes, and the effects of the stretching on the physical properties can be varied.

FIG. 2 further illustrates that the thinner ribs 46 can be intermittently dispersed about thicker ribs 44. In particular, each thinner rib 46 can reside between adjacent thicker ribs 44. Additionally, in one or more implementations the thicker ribs 44 can be visually distinct from the thinner ribs 46. For example, depending upon the degree of stretch, the thicker ribs 44 can be more opaque than the thinner ribs 46. In other words, the thinner ribs 46 can be more transparent than the thicker ribs 44 in one or more implementations.

The ribs 44, 46 or ribbed pattern 36 can provide a pleasing appearance and connote strength to a consumer. For example, the stripped pattern 36 can signify that the film 10b has undergone a physical transformation to modify one or more characteristics of the film 10b. For example, MD ring rolling the film 10 can increase or otherwise modify one or more of the tensile strength, tear resistance, impact resistance, or elasticity of the film 10b. The ribbed pattern 36 can signify the physical transformation to a consumer.

As alluded to earlier, the MD tear resistance of the MD incrementally-stretched film 10b can be based at least on part on the ratio of DOE to pitch. Furthermore, the ratio of DOE to pitch that will maintain or increase the MD tear resistance of a particular film can be based on one or more of the thermoplastic material of the film, the starting gauge of the film, and the BUR used to form the film. The following examples present the results of a series of tests performed on thermoplastic films that have been incrementally stretched in the machine direction. These examples are illustrative of the invention claimed herein and should not be construed to limit in any way the scope of the invention.

COMPARATIVE EXAMPLE 1

Figure 3:
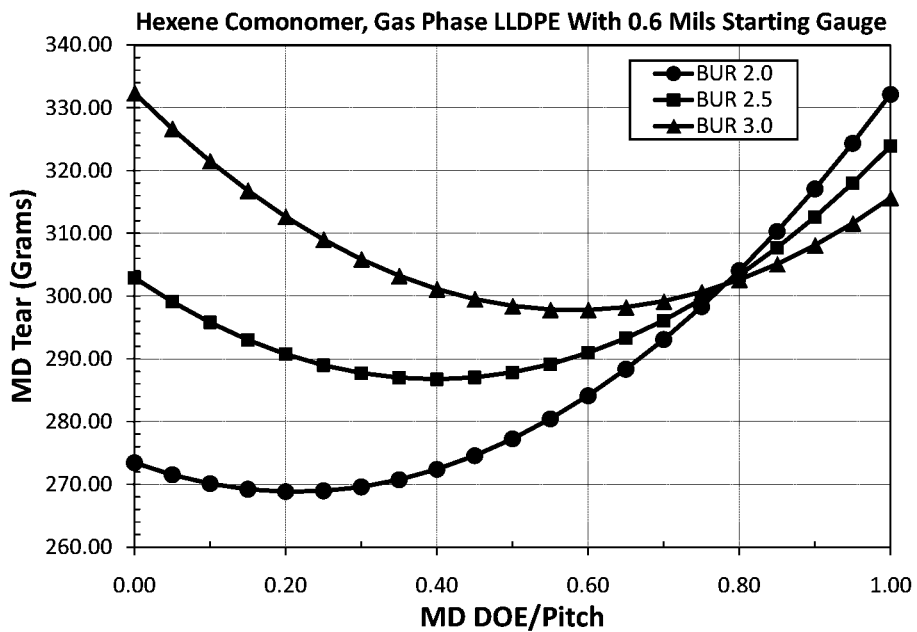
FIG. 3 is a chart that graphs, for three specific thermoplastic films having different blow-up ratios, the relationship between the ratio of MD depth-of-engagement to pitch and MD tear resistance in accordance with one or more implementations of the present invention.

In a first comparative example, three mono-layer films were MD incrementally stretched using a cold MD ring rolling process similar to that described herein above. The three films were hexene gas phase LLDPE films having a starting gauge of 0.6 mils and BURs of 2.0, 2.5, and 3.0, respectively. The intermeshing rolls used in comparative Example 1 had a 5.933" diameter, 0.100" pitch, 30 diametral pitch, and a 14½° pressure angle. The MD DOE to pitch ratio used to stretch the films varied from between 0 and 1.0. The MD tear resistance of these films was measured according to the methods and procedures set forth in ASTM D882-02. FIG. 3 is a chart that graphs the relationship between these films' MD tear resistance (y-axis) and the DOE to pitch ratio used to incrementally stretch the film in the machine direction (x-axis).

As shown by FIG. 3, the MD DOE to pitch ratio that produces a maintained or increased MD resistance to tear can be based at least on part on the BUR of the film. Specifically, MD DOE to pitch ratios between about 0.40 and 1.0 maintained or increased the MD tear resistance in the film produced with a 2.0 BUR. MD DOE to pitch ratios between about 0.80 and 1.0 maintained or increased the MD tear resistance in the film produced with a 2.5 BUR. On the other hand, none of MD DOE to pitch ratios maintained or increased the MD tear resistance of the film produced with a 3.0 BUR.

COMPARATIVE EXAMPLE 2

Figure 4:
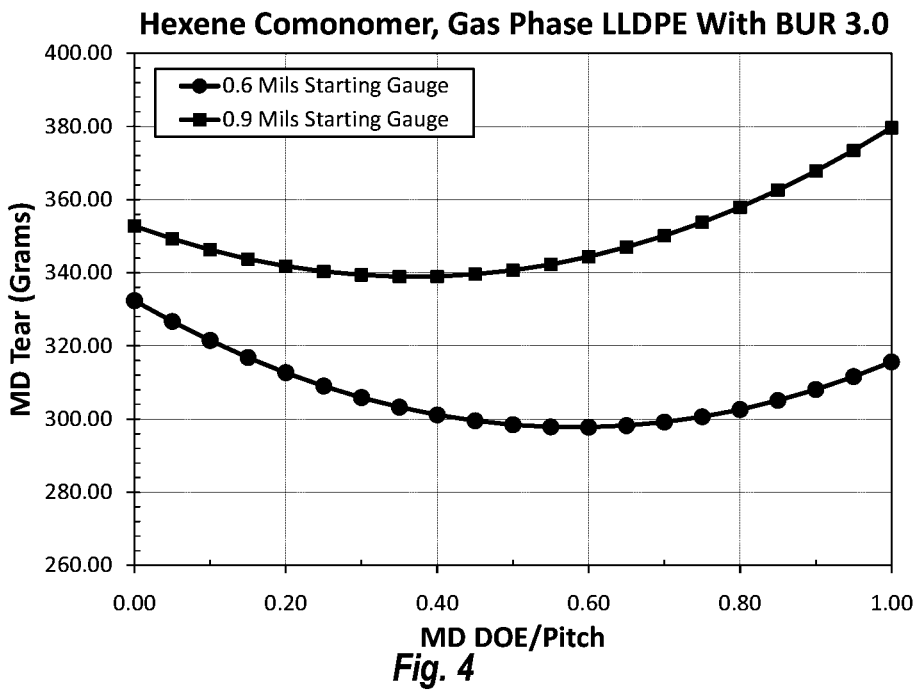
FIG. 4 is a chart that graphs, for two specific thermoplastic films having different starting gauges, the relationship between the ratio of MD depth-of-engagement to pitch and MD tear resistance in accordance with one or more implementations of the present invention.

In a second comparative example, a first thermoplastic film and a second thermoplastic film were MD incrementally stretched using a cold MD ring rolling process similar to that described herein above. The intermeshing rolls used in comparative Example 2 had a 5.933" diameter, 0.100" pitch, 30 diametral pitch, and a 14½° pressure angle. The MD DOE to pitch ratio used to stretch the films varied from between 0 and 1.0. The first thermoplastic film was a mono-layer hexene gas phase LLDPE film having a starting gauge of 0.6 mils and a BUR of 3.0. The second thermoplastic film was a mono-layer hexene gas phase LLDPE film having a starting gauge of 0.9 mils and a BUR of 3.0. The MD tear resistance of these stretched films was then measured according to the methods and procedures set forth in ASTM D882-02. FIG. 4 is a chart that graphs the relationship between these films' MD tear resistance (y-axis) and the MD DOE to pitch ratio used to incrementally stretch the film in the machine direction (x-axis).

As shown by FIG. 4, the MD DOE to pitch ratio that maintains or increases the MD tear resistance can be based at least on part on the starting gauge of the film. Specifically, MD DOE to pitch ratios between about 0.75 and 1.0 maintained or increased the MD tear resistance in the film with a 0.9 mils starting gauge. On the other hand, none of MD DOE to pitch ratios maintained or increased the MD tear resistance of the film produced with a 0.6 mils starting gauge.

COMPARATIVE EXAMPLE 3

Figure 5:
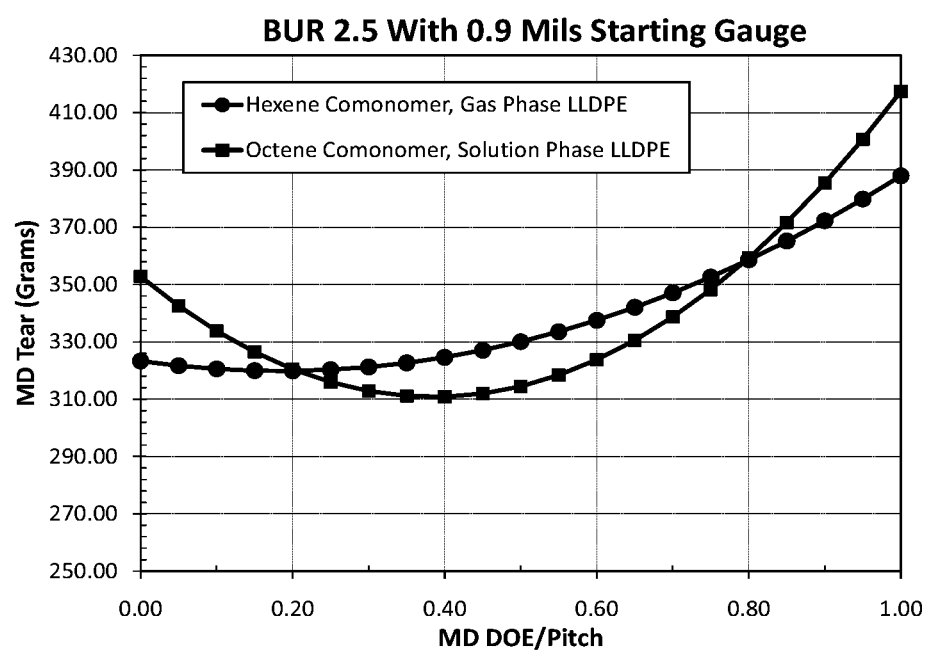
FIG. 5 is a chart that graphs, for two specific thermoplastic films of different thermoplastic material, the relationship between the ratio of MD depth-of-engagement to pitch and MD tear resistance in accordance with one or more implementations of the present invention.

In a third comparative example, a first thermoplastic film and a second thermoplastic film were MD incrementally stretched using a cold MD ring rolling process similar to that described herein above. The intermeshing rolls used in comparative Example 3 had a 5.933" diameter, 0.100" pitch, 30 diametral pitch, and a 14½° pressure angle. The MD DOE to pitch ratio used to stretch the films varied from between 0 and 1.0. The first thermoplastic film was a mono-layer hexene gas phase LLDPE film having a starting gauge of 0.9 mils and a BUR of 2.5. The second thermoplastic film was a mono-layer octene comonomer, solution phase LLDPE film having a starting gauge of 0.9 mils and a BUR of 2.5. The MD tear resistance of these stretched films was then measured according to the methods and procedures set forth in ASTM D882-02. FIG. 5 is a chart that graphs the relationship between these films' MD tear resistance (y-axis) and the MD DOE to pitch ratio used to incrementally stretch the film in the machine direction (x-axis).

As shown by FIG. 5, the MD DOE to pitch ratio that maintains or increases the MD tear resistance can be based at least on part on the thermoplastic material of the film. Specifically, MD DOE to pitch ratios between about 0.35 and 1.0 maintained or increased the MD tear resistance in the hexene gas phase LLDPE film. On the other hand, MD DOE to pitch ratios between about 0.75 and 1.0 maintained or increased the MD tear resistance in the octene comonomer, solution phase LLDPE film.

EXAMPLE 4

In a fourth example, a two-layered thermoplastic film was MD incrementally stretched using a cold MD ring rolling process similar to that described herein above. The intermeshing rolls used in comparative Example 4 had a 5.933" diameter, 0.100" pitch, 30 diametral pitch, and a 14½° pressure angle. The films were hexene gas phase LLDPE films having a starting gauge of 1.1 mils and a BUR of 2.0. The films were run through the MD ring rolling process at a line speed of 300 feet per minute. The MD DOE to pitch ratio used to stretch the films varied from between 0 and 1.0. The thermoplastic film was MD incrementally stretched with four different DOEs. Specifically, the film was MD incrementally stretched at MD DOEs of 0.25, 0.50, 0.75, and 1.

TABLE I

| | | Physical Properties | | |
|---|---|---|---|---|
| MD DOE/ Pitch | MD Tear (grams) | TD Tear (grams) | Dynatup Energy to max. load (In-Lb$_f$) | Gauge by Weight (GBW) (grams) |
| 0 | 312 | 932 | 5.63 | 1.069 |
| 0.25 | 308 | 867 | 7.01 | 1.132 |
| 0.50 | 380 | 905 | 6.60 | 1.081 |
| 0.75 | 380 | 973 | 4.05 | 1.038 |
| 1 | 502 | 972 | 4.58 | 0.962 |

Table I lists the physical properties of these films along with the physical properties of the un-stretched film. The results from Table I indicate that the bi-layer MD incrementally stretched film under certain conditions can have a maintained or increased MD tear resistance. Specifically, in some instances the MD tear resistance can be as great as 1.6 times the un-stretched film. Furthermore, Table I indicates that the TD tear resistance of the MD incrementally stretched can also increase under certain conditions. Furthermore, Table I indicates that the energy to maximum load (Dynatup Max), which relates to impact resistance, may not be significantly decreased under certain conditions.

Table I further illustrates that the incrementally stretched films can include a maintained or increased MD tear resistance despite a reduction in gauge. One will appreciate in light of the disclosure herein that this is an unexpected result, as MD tear resistance is expected to decrease as the gauge of the film decreases. For example, Table I illustrates that the un-stretched film (0 MD DOE) can have an MD tear resistance to GBW ratio of 291.86. While films processed according to one or more implementations of the present invention can include an MD tear resistance to GBW ratio as large as 1.8 times the un-stretched film. One or more implementations of the present inventions include incrementally stretched films with MD tear resistance to GBW ratios between about 1 and about 2 times greater than the un-stretched film. More particularly, one or more implementations of the present inventions include incrementally stretched films with MD tear resistance to GBW ratios between about 1.2 and about 1.8 times greater than the un-stretched film.

EXAMPLE 5

In a fifth example, two mono-layer films were MD incrementally stretched using a cold MD ring rolling process similar to that described herein above. The first film was a hexene gas phase LLDPE film with a density of 0.926, a starting gauge of 0.9 mils, and a BUR of 2.9. The second film was a hexene gas phase LLDPE film with a density of 0.918, a starting gauge of 0.9 mils, and a BUR of 2.0. The intermeshing rolls used in comparative Example 4 had a 5.933" diameter, 0.100" pitch, 30 diametral pitch, and a 14½° pressure angle. The MD DOE to pitch ratio used to stretch the films varied from between 0 and 1.0. The MD tear resistance of these films was measured according to the methods and procedures set forth in ASTM D882-02.

TABLE II

Physical Properties

| Run # | MD DOE/Pitch | BUR | MD Tear (grams) | TD Tear (grams) | Dynatup Energy to max. load (In-Lb$_f$) | GBW relative to un-stretched film (%) |
|---|---|---|---|---|---|---|
| Un-stretched Film | 0 | 2.9 | 380 | 704 | 6.60 | 1.00 |
| 1 | 0.50 | 2.9 | 457 | 642 | 5.02 | 1.00 |
| 2 | 1 | 2.9 | 370 | 706 | 4.75 | 93 |
| Un-stretched Film | 0 | 2.0 | 125 | 696 | 4.37 | 100 |
| 3 | 0.50 | 2.0 | 173 | 614 | 4.44 | 100 |
| 4 | 1 | 2.0 | 273 | 846 | 3.49 | 78 |

The results from Table II show physical properties of the films of Example 5. The results indicate that the MD incrementally stretched film under certain conditions can have a maintained or increased MD tear resistance and/or a maintained or increased TD tear despite a reduction in gauge. One will appreciate in light of the disclosure herein that this is an unexpected result, as tear resistance is expected to decrease as the gauge of the film decreases. Specifically, in some instances the MD tear resistance was shown to be as great as 2.2 times the un-stretched film. Also, the increase in TD tear resistance was shown to be as great as 1.2 times the un-stretched film.

In particular, in run 1 a thermoplastic film was MD incrementally stretched using MD intermeshing rollers with an MD DOE to pitch ratio of 0.50. Run 1 yielded an MD incrementally stretched film with an increase in MD tear resistance of about 20%, a decrease in TD tear resistance of about 9%, and virtually no change in gauge by weight. The reduction in TD tear resistance may be considered acceptable, particularly when combined with an increase in MD tear resistance of 20%.

In run 2, a thermoplastic film was MD incrementally stretched using MD intermeshing rollers with an MD DOE to pitch ratio of 1. Run 2 yielded an MD incrementally stretched film with a decrease in MD tear resistance of about 3%, minimal change in TD tear resistance, and a gauge reduction of 7%. The reduction in MD tear resistance may be considered acceptable, particularly when combined with a gauge reduction of 7%.

In run 3, a thermoplastic film was MD incrementally stretched using MD intermeshing rollers with an MD DOE to pitch ratio of 0.50. Run 3 yielded an MD incrementally stretched film with an increase in MD tear resistance of about 40%, a decrease in TD tear resistance of about 12%, and virtually no change in gauge by weight. The reduction in TD tear resistance may be considered acceptable, particularly when combined with an increase in MD tear resistance of 40%. Thus, one or more implementations allow a user to cold ring roll a film to increase the MD tear resistance without significantly changing the gauge.

In run 4, a thermoplastic film was MD incrementally stretched using MD intermeshing rollers with an MD DOE to pitch ratio of 1. Run 4 yielded an MD incrementally stretched film with an increase in MD tear resistance of about 120%, an increase in TD tear resistance of about 22%, and a reduction in gauge of about 22%. The increase in both MD tear resistance and TD tear resistance is particularly unexpected in light of the gauge reduction of 22%. Thus, one or more implementations allow a user to cold ring roll a film to reduce the gauge of a film, while also increasing one or more of the MD or TD tear resistance. Such a film can allow for considerable material savings while simultaneously producing a stronger film.

Figure 6:
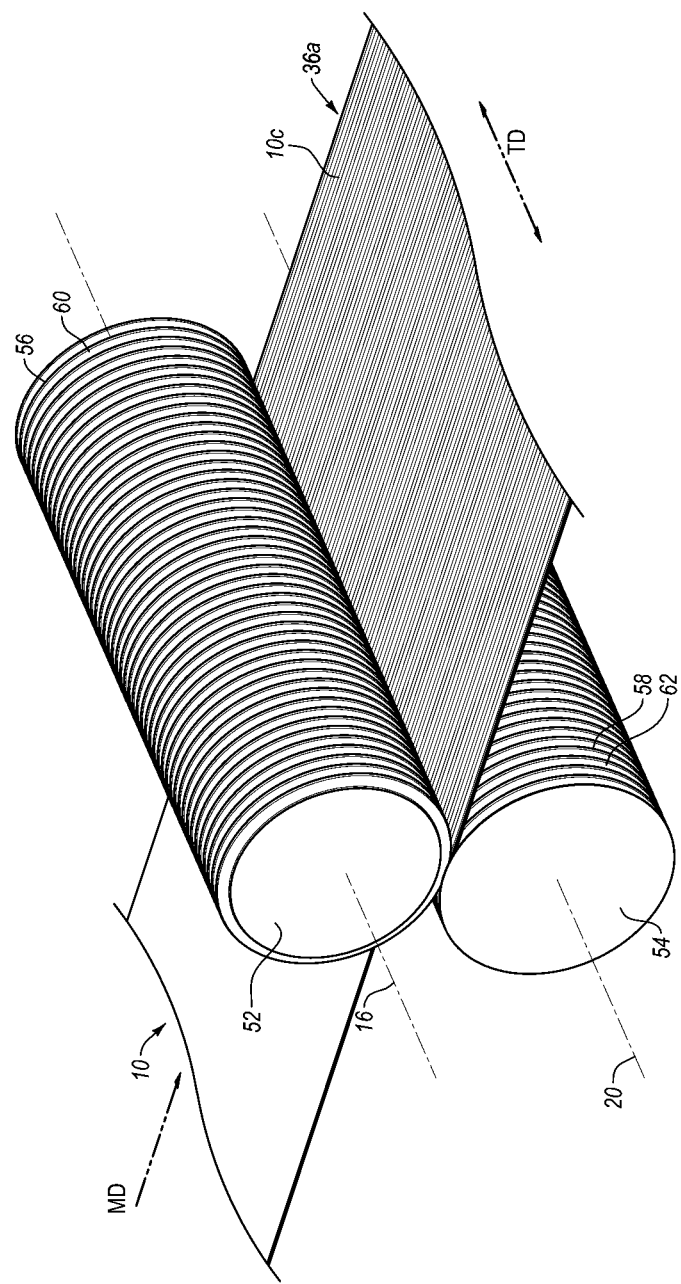
FIG. 6 illustrates a schematic diagram of a thermoplastic film being incrementally stretched by TD intermeshing rollers in accordance with one or more implementations of the present invention.

In addition to MD ring rolling, implementations of the present invention further include additionally, or alternatively, using TD ring rolling to incrementally stretch a thermoplastic film to enhance, or otherwise modify, physical properties of the film. For example, FIG. 6 illustrates a TD ring rolling process that incrementally stretches a thermoplastic film 10 by passing the film 10 through a pair of TD intermeshing rollers 52, 54. A TD ring rolling processes (and associated TD intermeshing rollers 52, 54) can be similar to the MD ring rolling process (and associated MD intermeshing rollers 12, 14) described herein above, albeit that the ridges 56, 58 and grooves 60, 62 of the TD intermeshing rollers 52, 54 can extend generally orthogonally to the axes of rotation 16, 20.

Thus, as shown by FIG. 6, as the thermoplastic film 10 passes between the intermeshing rollers 52, 54, the ridges 56, 58 can incrementally stretch the film 10 in the transverse direction. In particular, as the film 10 proceeds between the intermeshing rollers 52, 54, the ridges 56, 58 can impart or form a ribbed pattern 36a into the film 10 to form a TD incrementally-stretched film 10c.

Similar to an MD ring rolling process, the pitch and depth of engagement of the ridges 56, 58 can determine, at least in part, the amount of incremental stretching created by the TD intermeshing rollers 52, 54. The ratio of TD DOE to pitch can determine, at least in part, the amount of stretch imparted by a pair of TD intermeshing rollers 52, 54, and the effect upon the gauge and other physical properties of the film. 10.

As shown by FIG. 6, the direction of travel of the film 10 through the TD intermeshing rollers 52, 54 is parallel to the machine direction and perpendicular to the transverse direction. As the thermoplastic film 10 passes between the TD intermeshing rollers 52, 54, the ridges 56, 58 can incrementally stretch the film 10 in the transverse direction. In some implementations, stretching the film 10 in the transverse direction can reduce the gauge of the film and increase the width of the film 10. In other implementations, the film 10 may rebound after stretching such that the gauge of the film 10 is not decreased. Furthermore, in some implementations, stretching the film 10 in the transverse direction can reduce the length of the film 10. For example, as the width of the film 10 is increased, the film's length can be reduced.

In particular, as the film 10 proceeds between the TD intermeshing rollers 52, 54, the ridges 56 of the first roller 52 can push the film 10 into the grooves 62 of the second roller 54 and vice versa. The pulling of the film 10 by the ridges 56, 58 can stretch the film 10. The TD intermeshing rollers 52, 54 may not stretch the film 10 evenly along its length. Specifically, the rollers 56, 58 can stretch the portions of the film 10 between the ridges 56, 58 more than the portions of the film 10 that contact the ridges 56, 58. Thus, the TD intermeshing rollers 52, 54 can impart or form a ribbed pattern 36a into the film 10.

Figure 7:
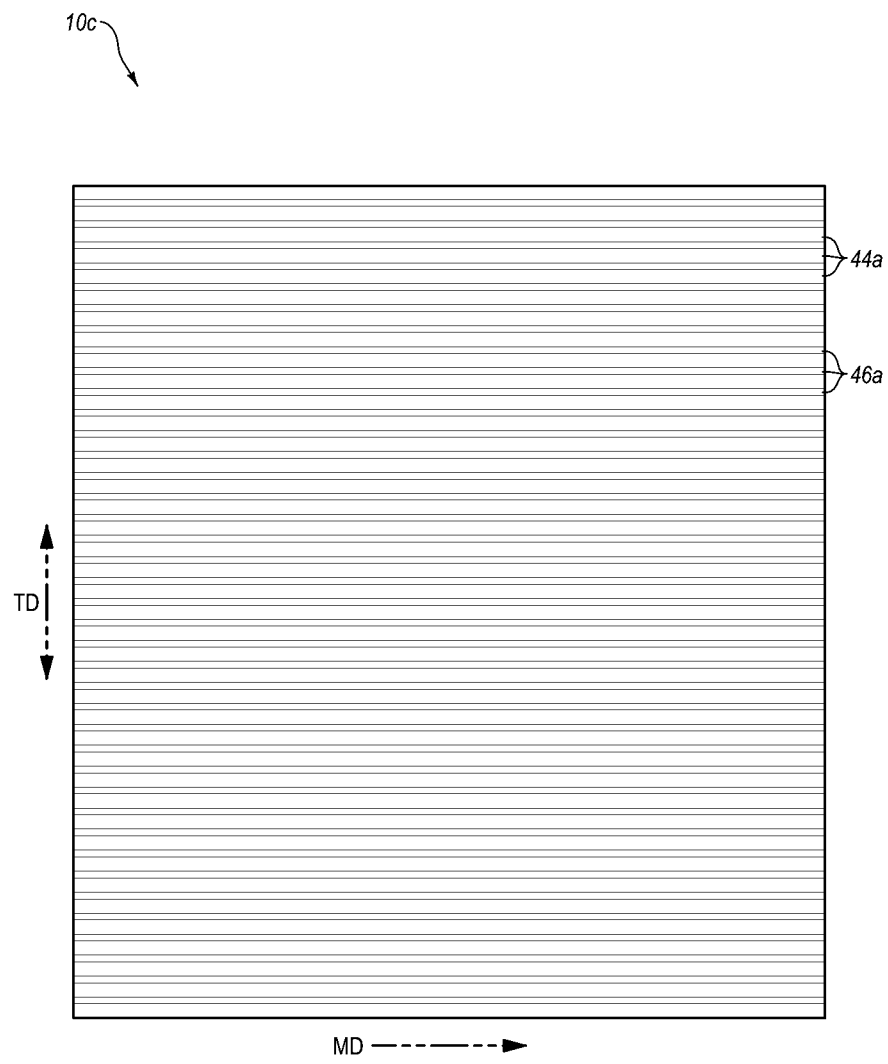
FIG. 7 illustrates a view of a thermoplastic film with enhanced physical properties created by the MD intermeshing rollers of FIG. 6.

FIG. 7 illustrates a top view of the TD incrementally-stretched film 10c. As shown, the TD incrementally-stretched film 10c can include ribs 44a, 46a that extend across the film 10c in the direction in which the film was extruded (i.e., machine direction). As shown by FIG. 7, ribs 44a, 46a can extend across the entire length of the film 10c. The pitch and the DOE of the ridges 56, 58 of the TD intermeshing rollers 52, 54 can determine the width and spacing of the ribs 44a, 46a. Thus, as explained in greater detail below, by varying the pitch and/or DOE, the width and/or spacing of the ribs 44a, 46a, the amount of stretching the film undergoes, and the effects of the stretching on the physical properties can be varied.

The ribbed pattern 36a can include alternating series of thicker sections or ribs 44a and thinner sections or ribs 46a. The thicker ribs 44a can comprise "un-stretched" regions and the thinner ribs 46a can comprise stretched regions. In one or more implementations, the thicker ribs 44a regions of the incrementally-stretched films may be stretched to a small degree. In any event, the thicker ribs 44a are stretched less compared to the thinner ribs 46a.

The thicker ribs 44a can have a first average thickness or gauge. The first average gauge can be approximately equal to a starting gauge of the film 10. In one or more implementations, the first average gauge can be less than the starting gauge. The thinner ribs 46a can have a second average thickness or gauge. The second average gauge can be less than both the starting gauge and the first average gauge.

One will appreciate in light of the disclosure herein that the ribbed pattern 36a may vary depending on the method used to incrementally stretch the film 10. To the extent that TD ring rolling is used to incrementally stretch the film 10, the ribbed pattern 36a on the film 10 can depend on the pitch of the ridges 56, 58, the DOE, and other factors. In some implementations, the molecular structure of the thermoplastic material of the film 10 may be rearranged to provide this shape memory.

FIG. 7 further illustrates that the thinner ribs 46a can be intermittently dispersed about thicker ribs 44a. In particular, each thinner rib 46a can reside between adjacent thicker ribs 44a. Additionally, in one or more implementations, the thicker ribs 44a can be visually distinct from the thinner ribs 46a. For example, depending upon the degree of stretch, the thicker ribs 44a can be more opaque than the thinner ribs 46a. In other words, the thinner ribs 46a can be more transparent or translucent than the thicker ribs 44a in one or more implementations.

The ribs 44a, 46a or ribbed pattern 36a can provide a pleasing appearance and connote strength to a consumer. For example, the ribbed pattern 36a can signify that the film 10c has undergone a transformation to modify one or more characteristics of the film 10c. For example, TD ring rolling the film 10 can increase or otherwise modify one or more of the tensile strength, tear resistance, impact resistance, or elasticity of the film 10c. The ribbed pattern 36a can signify the transformation to a consumer.

The MD tear resistance of the TD incrementally-stretched film 10c can be based at least in part on the ratio of TD DOE to pitch. Furthermore, the ratio of TD DOE to pitch that will maintain or increase the MD tear resistance of a particular film can be based on one or more of the thermoplastic material of the film, the starting gauge of the film, and the BUR used to form the film. The following examples present the results of a series of tests performed on thermoplastic films that have been incrementally stretched in the transverse direction. These examples are illustrative of the invention claimed herein and should not be construed to limit in any way the scope of the invention.

EXAMPLE 6

Figure 8:
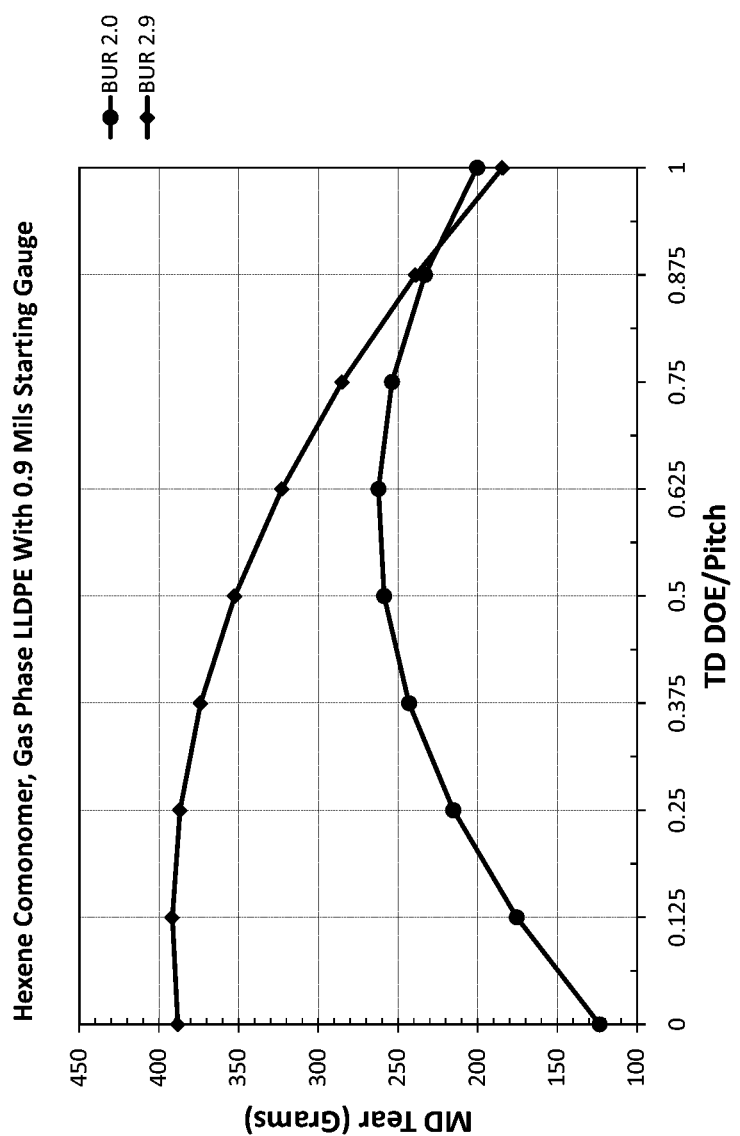
FIG. 8 is a chart that graphs, for two specific thermoplastic films having different blow-up ratios, the relationship between the ratio of TD depth-of-engagement to pitch and MD tear resistance in accordance with one or more implementations of the present invention.

In a sixth example, the same two mono-layer films as used in Example 5 were TD incrementally stretched using a cold TD ring rolling process similar to that described herein above. The TD intermeshing rolls used in Example 6 had a 0.040" pitch. The TD DOE to pitch ratio used to stretch the films varied from between 0 and 1.0. The MD tear resistance of these films was measured according to the methods and procedures set forth in ASTM D882-02. FIG. 8 is a chart that graphs the relationship between these films' MD tear resistance (y-axis) and the TD DOE to pitch ratio used to incrementally stretch the film in the transverse direction (x-axis).

As shown by FIG. 8, the TD DOE to pitch ratio that produces a maintained or increased MD resistance to tear can be based at least on part on the BUR and the thermoplastic material of the film. Specifically, TD DOE to pitch ratios up to about 0.625 increased the MD tear resistance in the film produced with a 2.0 BUR. TD DOE to pitch ratios between 0.625 and 1 decreased the MD tear resistance in the film produced with a 2.0 BUR compared to the MD tear resistance at a TD DOE to pitch ratio of 0.625. TD DOE to pitch ratios up to about 0.25 maintained the MD tear resistance in the film produced with a 2.9 BUR. TD DOE to pitch ratios between about 0.25 and about 1 decreased the MD tear resistance in the film produced with a 2.9 BUR.

TABLE III

| | Physical Properties | | | | | |
|---|---|---|---|---|---|---|
| Run # | TD DOE/ Pitch | BUR | MD Tear (grams) | TD Tear (grams) | Dynatup Energy to max. load (In-Lb$_f$) | GBW relative to un-stretched film (%) |
| Un-stretched Film | 0 | 2.9 | 380 | 704 | 6.60 | 1.00 |
| 1 | 0.50 | 2.9 | 352 | 431 | 6.93 | 92 |
| 2 | 1 | 2.9 | 231 | 85 | 8.05 | 64 |
| Un-stretched Film | 0 | 2.0 | 125 | 696 | 4.37 | 100 |
| 3 | 0.50 | 2.0 | 235 | 333 | 3.56 | 86 |
| 4 | 1 | 2.0 | 191 | 72 | 2.98 | 73 |

The results from Table III show additional physical properties of the films of Example 6. The results indicate that the TD incrementally stretched film under certain conditions can have a maintained or increased MD tear resistance. Specifically, in some instances the increase in MD tear resistance can be as great as 1.88 times the un-stretched film. Furthermore, Table III indicates that the TD tear resistance of the TD incrementally stretched generally decreases with TD ring rolling. Table III additionally indicates that the energy to maximum load (Dynatup Max), which relates to impact resistance, may be maintained or increased under certain conditions. Table III further illustrates that the incrementally stretched films can include a maintained or increased MD tear resistance despite a reduction in gauge. One will appreciate in light of the disclosure herein that this is an unexpected result, as MD tear is expected to decrease as the gauge of the film decreases.

For example, in run 3 of example 6, a thermoplastic film was TD incrementally stretched using TD intermeshing rollers with an TD DOE to pitch ratio of 0.50. Run 3 yielded a TD incrementally stretched film with an increase in MD tear resistance of about 88%, a decrease in TD tear resistance of about 52%, and a reduction in gauge of about 14%. The reduction in MD tear resistance may be considered acceptable, particularly when combined with a gauge reduction of 14%.

Figure 9:
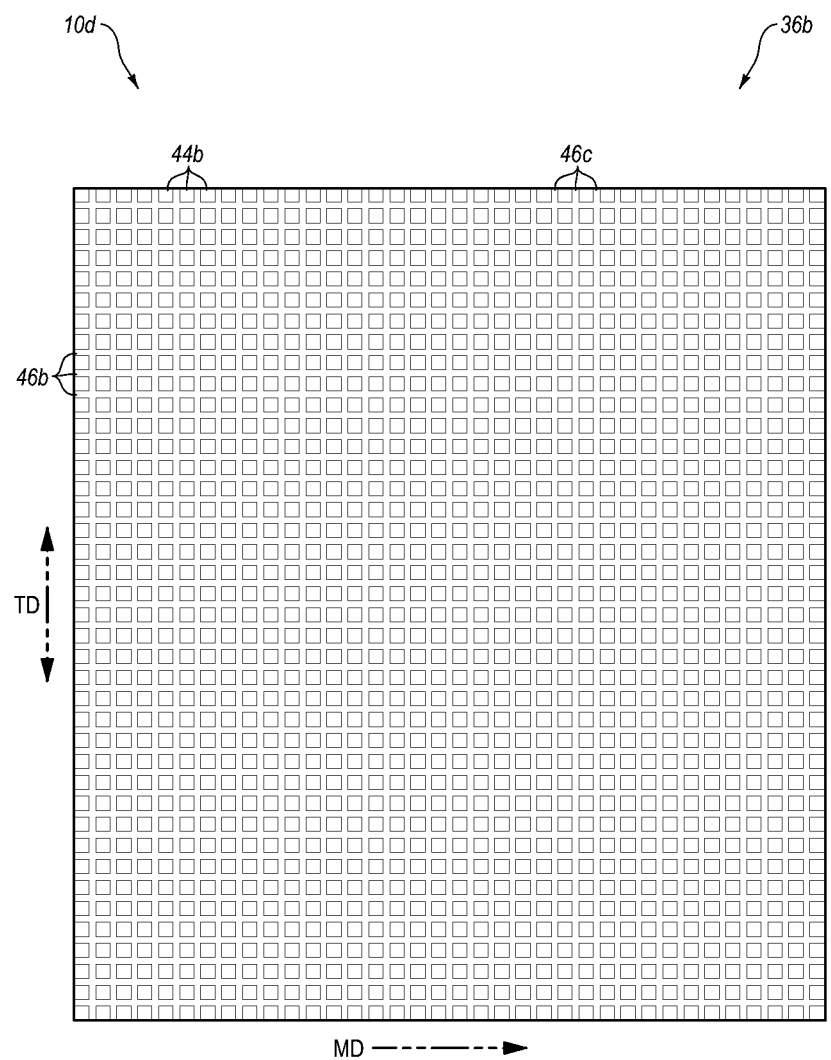
FIG. 9 illustrates a view of a thermoplastic film with enhanced physical properties created by the intermeshing rollers of both FIG. 1 and FIG. 6.

In still further implementations, a film 10 can undergo both an MD ring rolling process and a TD ring rolling process to further enhance, or otherwise modify, the physical properties of the film. For example, FIG. 9 illustrates a top view of an incrementally-stretched film 10d created by MD and TD ring rolling. The incrementally-stretched film 10d can have a ribbed or checker board pattern 36b. The ribbed pattern 36b can include alternating series of thicker ribs or regions 44a and thinner ribs 46b, 46c. The thinner ribs 46b, 46c can include ribs 46b that extend along the film 10c in the machine direction created by TD ring rolling, and ribs 46c that extend along the film in the transverse direction created by MD ring rolling. As shown by FIG. 9, in one or more implementations, the aspect ratio of the rows and columns of the stretched thinner ribs 46b, 46c can be approximately 1 to 1. In alternative implementations, the aspect ratio of the rows and columns of the rows and columns of the stretched thinner ribs 46b, 46c can be greater or less than 1 to 1, as explained in greater detail in relation to FIG. 13.

The incrementally-stretched film 10d created by MD and TD ring rolling can allow for even greater material savings by further increasing the surface area of a given portion of film. Additionally, MD and TD ring rolling can provide properties or advantages not obtained by MD or TD ring rolling alone. Thus, checker board pattern 36b created by the thinner ribs 46b, 46c can signify these transformations to a consumer.

As alluded to earlier, the tear resistance or other properties of the incrementally-stretched film 10d can be based at least on part on the ratios of TD and MD DOE to pitch. Furthermore, the ratios of TD and MD DOE to pitch that will maintain or increase the tear resistance or other properties of a particular film can be based on one or more of the thermoplastic material of the film, the starting gauge of the film, and the BUR used to form the film. The following examples present the results of a series of tests performed on thermoplastic films that have been incrementally stretched in the machine direction and transverse directions. These examples are illustrative of the invention claimed herein and should not be construed to limit in any way the scope of the invention.

EXAMPLE 7

In a seventh example, the two mono-layer films used in Examples 5 and 6 were MD and TD incrementally stretched using a cold ring rolling processes similar to that described herein above. The MD intermeshing rolls used in comparative Example 7 had a 5.933" diameter, 0.100" pitch, 30 diametral pitch, and a 14½° pressure angle. The MD DOE to pitch ratio used to stretch the films varied from between 0 and 1.0. The TD intermeshing rolls used in Example 7 had a 0.040" pitch. The TD DOE to pitch ratio used to stretch the films varied from between 0 and 1.0. The MD tear resistance of these films was measured according to the methods and procedures set forth in ASTM D882-02.

Figure 10:
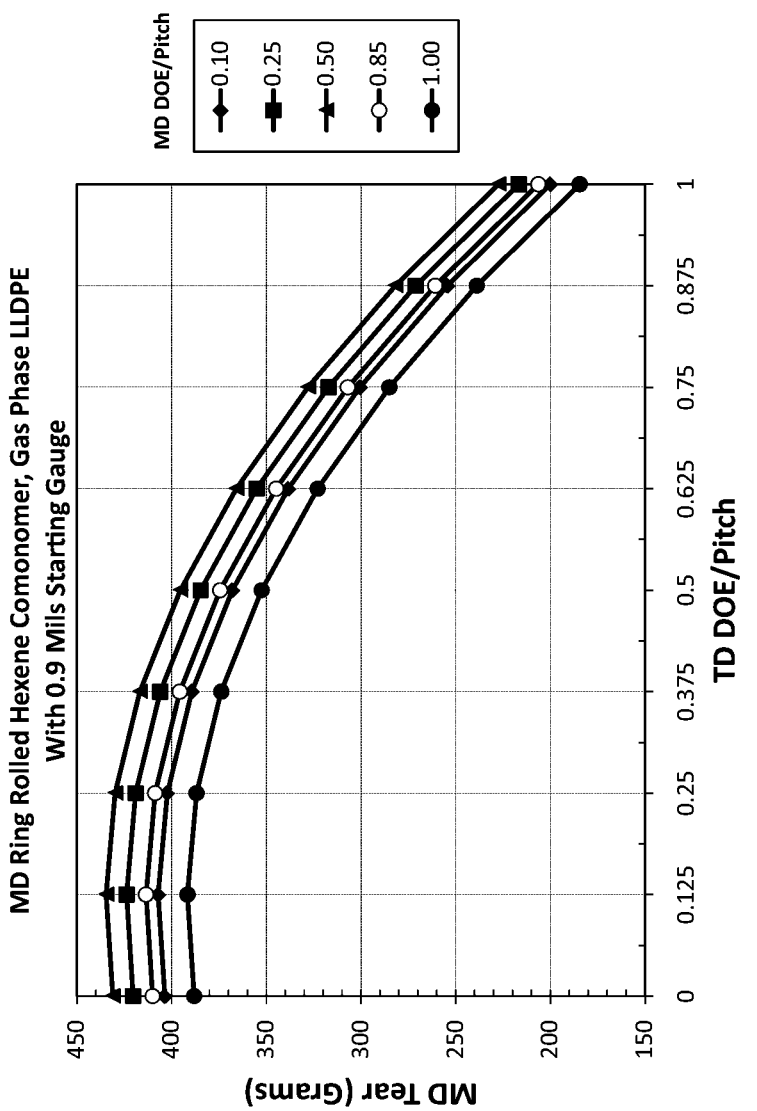
FIG. 10 is a chart that graphs, for a specific thermoplastic film MD ring rolled at five different MD depth-of-engagement to pitch ratios, the relationship between the ratio of TD depth-of-engagement to pitch and MD tear resistance in accordance with one or more implementations of the present invention.

The first film was first MD ring rolled. The first film was then TD ring rolled, and the effect of the TD ring rolling on the MD incrementally stretched film was observed. FIG. 10 is a chart that graphs the relationship between the first films' MD tear resistance (y-axis) and the TD DOE to pitch ratio used to incrementally stretch the film in the transverse direction (x-axis). The different starting points of the various curves along the y-axis are due to the effects of the MD ring rolling at five different MD DOE to pitch ratios. As shown by FIG. 10, TD DOE to pitch ratios of up to about 0.50 change the MD tear resistance little or slowly. One will appreciate in light of the disclosure herein that this can allow a manufacturer to further reduce the gauge of a MD incrementally stretched film without significantly reducing or changing the MD tear resistance of the film. FIG. 10 also shows that TD DOE to pitch ratios of greater than about 0.50 cause the MD tear resistance to decrease quickly.

Figure 11:
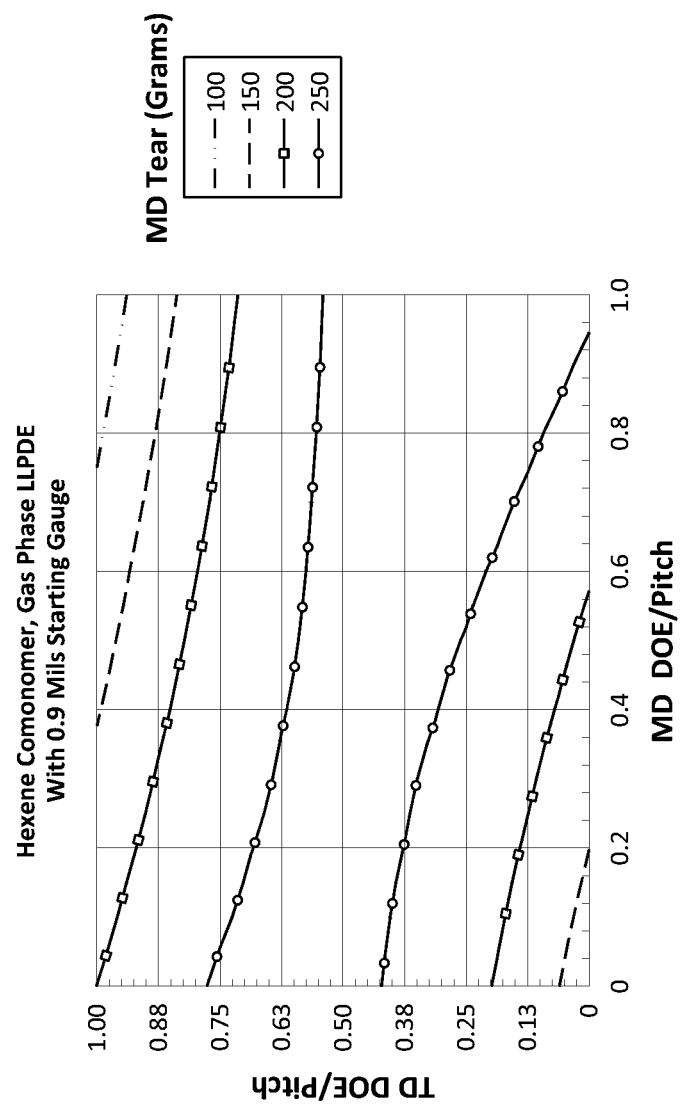
FIG. 11 is a contour plot that shows the effect of the ratio of MD depth-of-engagement to pitch and the ratio of TD depth-of-engagement to pitch on MD tear resistance in accordance with one or more implementations of the present invention.

FIG. 11 illustrates a contour plot that shows the effects of the ratio of MD depth-of-engagement to pitch and the ratio of TD depth-of-engagement to pitch on MD tear resistance of the second film. In particular, FIG. 11 shows that below a TD DOE to pitch ratio of about 0.50, increasing the MD DOE to pitch ratio increases the MD tear resistance. Additionally, FIG. 11 shows that TD DOE to pitch ratios up to about 0.50 increase the MD tear resistance. Still further, FIG. 11 shows that TD DOE to pitch ratios past about 0.50 reduce the MD tear resistance.

TABLE IV

| | Physical Properties | | | | | | |
|---|---|---|---|---|---|---|---|
| Run # | BUR | MD DOE/ Pitch | TD DOE/ Pitch | MD Tear (grams) | TD Tear (grams) | Dynatup Energy to max. load (In-Lb$_f$) | GBW relative to un-stretched film (%) |
| Un-stretched Film | 2.9 | 0 | 0 | 380 | 704 | 6.60 | 100 |
| 1 | 2.9 | 0.50 | 0.50 | 377 | 462 | 6.87 | 91 |
| 2 | 2.9 | 1.00 | 0.50 | 371 | 453 | 4.21 | 82 |
| 3 | 2.9 | .050 | 1.00 | 219 | 82 | 6.13 | 61 |
| 4 | 2.9 | 1.00 | 1.00 | 146 | 101 | 4.02 | 53 |
| Un-stretched Film | 2.0 | 0 | 2.0 | 125 | 696 | 4.37 | 100 |
| 5 | 2.0 | 0.50 | 0.50 | 268 | 418 | 3.33 | 86 |
| 6 | 2.0 | 1.00 | 0.50 | 273 | 570 | 2.28 | 71 |
| 7 | 2.0 | .050 | 1.00 | 138 | 60 | 2.81 | 56 |
| 8 | 2.0 | 1.00 | 1.00 | 71 | 76 | 0.82 | 44 |

The results from Table IV show additional physical properties of the films of Example 7. The results indicate that the combined MD and TD incrementally stretched films under certain conditions can have a maintained or increased MD tear resistance. Specifically, in some instances the increase in MD tear resistance can be as great as 1.88 times the un-stretched film. Table IV further illustrates that the incrementally stretched films can include a maintained or increased MD tear resistance despite a reduction in gauge. As mentioned previously, this is an unexpected result, as MD tear resistance is expected to decrease as the gauge of the film decreases.

For example, in runs 1 and 2 of Example 7, the first thermoplastic film was TD incrementally stretched and MD incrementally stretched. Runs 1 and 2 yielded an incrementally stretched film with a maintained MD tear resistances, despite reductions in gauge of about 9% and about 18%, respectively. The reduction in TD tear resistance associated with runs 1 and 2 may be considered acceptable, particularly when combined with gauge reductions of 9% and 14%.

In run 6 of Example 7, a thermoplastic film was MD and TD incrementally stretched. Run 3 yielded an incrementally stretched film with an increase in MD tear resistance of about 120%, a decrease in TD tear resistance of about 18%, and a reduction in gauge of about 29%. The reduction in TD tear resistance may be considered acceptable, particularly when combined with a gauge reduction of 29%.

As shown by the various examples hereinabove, cold ring rolling can yield an increase in MD tear resistance in one or more implementations. Additionally, in one or more implementations cold ring rolling can produce a reduction in film gauge, along with the unexpected result of maintained or increased tear resistance(s). Furthermore, MD and TD cold ring rolling together can produce further gauge reductions with no, little, or otherwise acceptable losses in tear resistance(s).

One will appreciate in light of the disclosure herein that the MD and/or TD incrementally-stretched films with maintained or increased tear resistance(s) can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include MD and/or TD incrementally-stretched with maintained or increased physical properties to one extent or another. Trash bags and food storage bags, in particular, may benefit by the films of the present invention.

Figure 12:
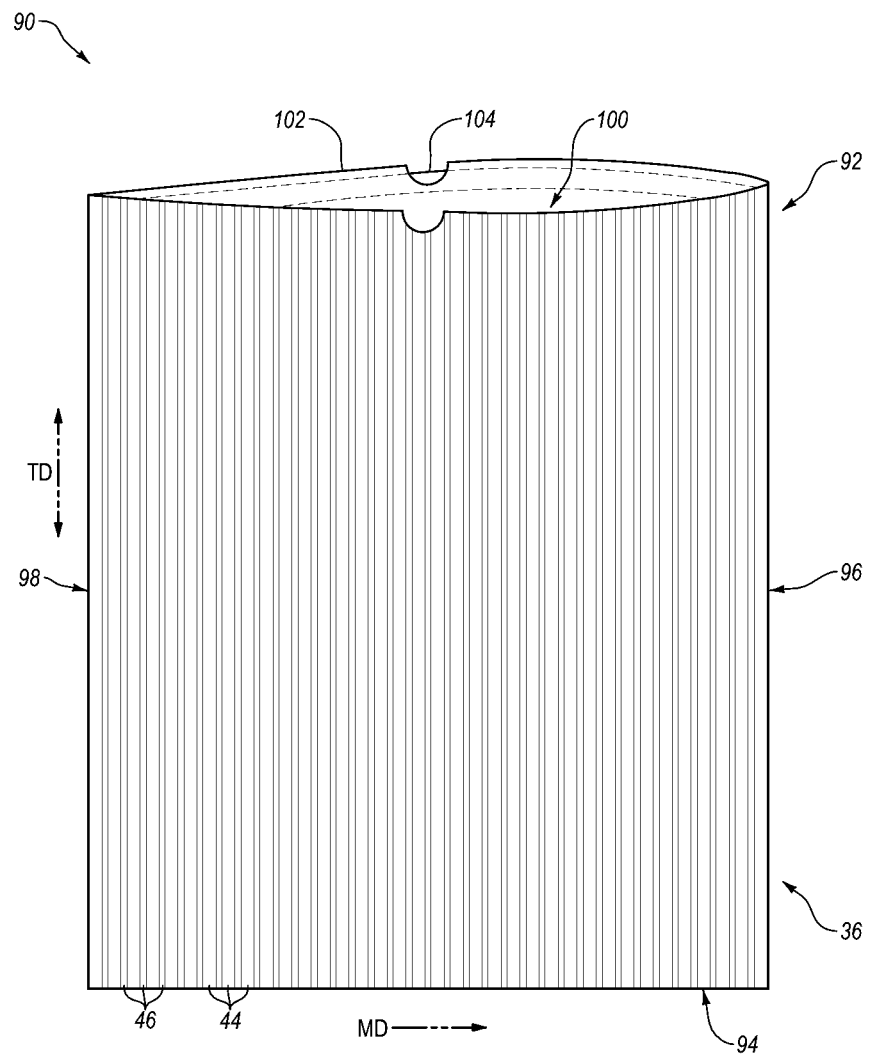
FIG. 12 illustrates a bag incorporating an MD-incrementally stretched film in accordance with one or more implementations of the present invention.

Referring to FIG. 12, in a particular implementation of the present invention, the MD incrementally-stretched film 10*b* illustrated in FIGS. 1A-1B may be incorporated in a bag construction, such as a flexible draw tape bag 90. The bag 90 can include a bag body 92 formed from a piece of MD incrementally-stretched film 10*b* folded upon itself along a bag bottom 94. Side seams 96 and 98 can bond the sides of the bag body 92 together to form a semi-enclosed container having an opening 100 along an upper edge 102. The bag 90 also optionally includes closure means 104 located adjacent to the upper edge 102 for sealing the top of the bag 90 to form a fully-enclosed container or vessel. The bag 90 is suitable for containing and protecting a wide variety of materials and/or objects. The closure means 104 can comprise flaps, adhesive tapes, a tuck and fold closure, an interlocking closure, a slider closure, a zipper closure or other closure structures known to those skilled in the art for closing a bag.

As shown, the sides of the bag body 92 can include a ribbed pattern 36. The ribbed pattern 36 can include alternating series of thicker ribs and thinner ribs. The ribs can extend across the bag 90 in the TD direction, or in other words, from the bag bottom 94 to the upper edge 102. The bag 90 can require less material to form than an identical bag formed with an un-stretched film 10 of the same thermoplastic material. Additionally, despite requiring less material, the bag 90 can have the same or greater MD and/or TD tear resistance than an identical bag formed with an un-stretched film 10 of the same thermoplastic material. The maintained or increased tear resistance(s) can help prevent the bag 90 from tearing and losing the contents.

Figure 13:
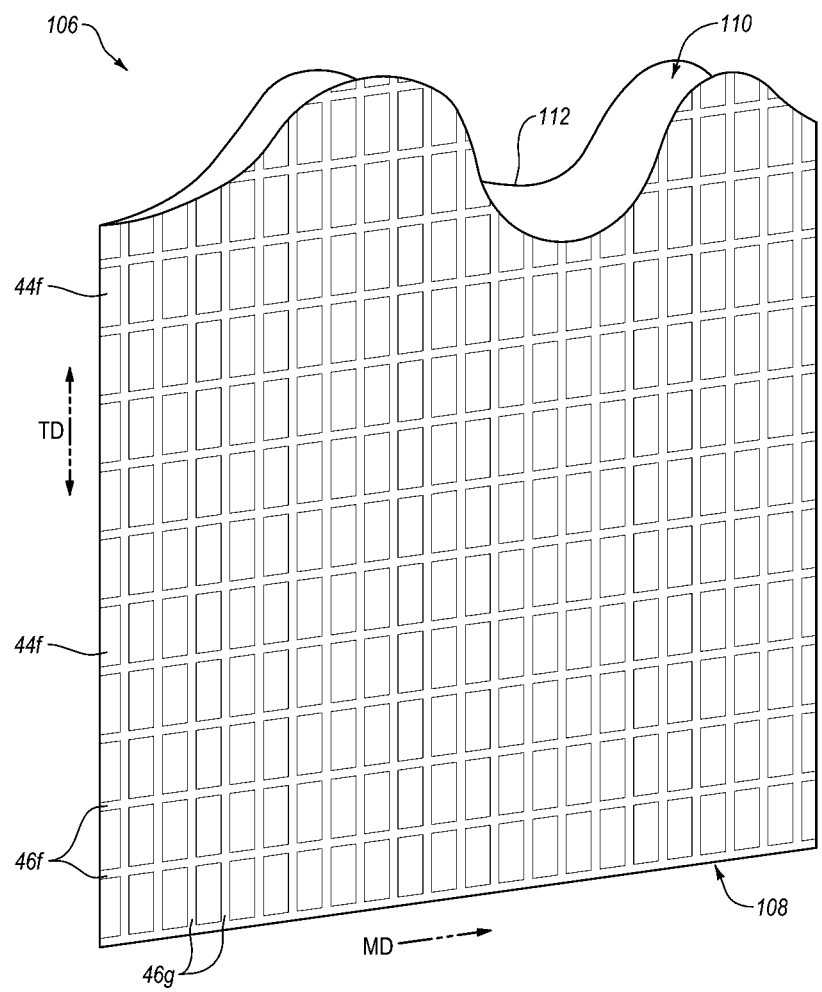
FIG. 13 illustrates a bag incorporating an MD- and TD-incrementally stretched film in accordance with one or more implementations of the present invention.

FIG. 13 illustrates a tie bag 106 incorporating an MD- and TD-incrementally-stretched film in accordance with an implementation of the present invention. As shown, the sides of the tie bag 106 can include a ribbed pattern. The ribbed pattern can include thicker ribs or un-stretched regions 44*f* and thinner ribs 46*f*, 46*g* created by MD and TD ring rolling.

The ribbed pattern can include thinner ribs 46*f* that extend across the bag 106 in the machine direction. Additionally, the ribbed pattern can include thinner ribs 46*g* that extend across the bag 106 in the transverse direction, or in other words from the bag bottom 108 to flaps 110 of an upper edge 112 of the bag 106.

In comparison with the film 10*d* of FIG. 9, the spacing between the MD extending thinner ribs 46*f* is greater in the bag 106. This effect is created by using MD ring rolls having a greater pitch between ridges. Similarly, the spacing of the TD extending thinner ribs 46*g* is greater in the bag 106 than the film 10*d*. This effect is created by using TD ring rolls having a greater pitch between ridges. Furthermore, the relative spacing between the MD extending stripes and the TD extending ribs differs in the bag 106, while relative spacing is the same in the film 10*d*. This effect is created by using TD ring rolls having a greater pitch between ridges compared to the pitch between ridges of the MD ring rolls. One will appreciate in light of the disclosure herein that the use of intermeshing rollers with greater or varied ridge pitch can provide the different spacing and thicknesses of the ribs. Thus, one will appreciate in light of the disclosure herein that a manufacturer can vary the ridge pitch of the intermeshing rollers to vary the pattern of the ribs, and thus, the aesthetic and/or properties of the bag or film.

Figure 14:
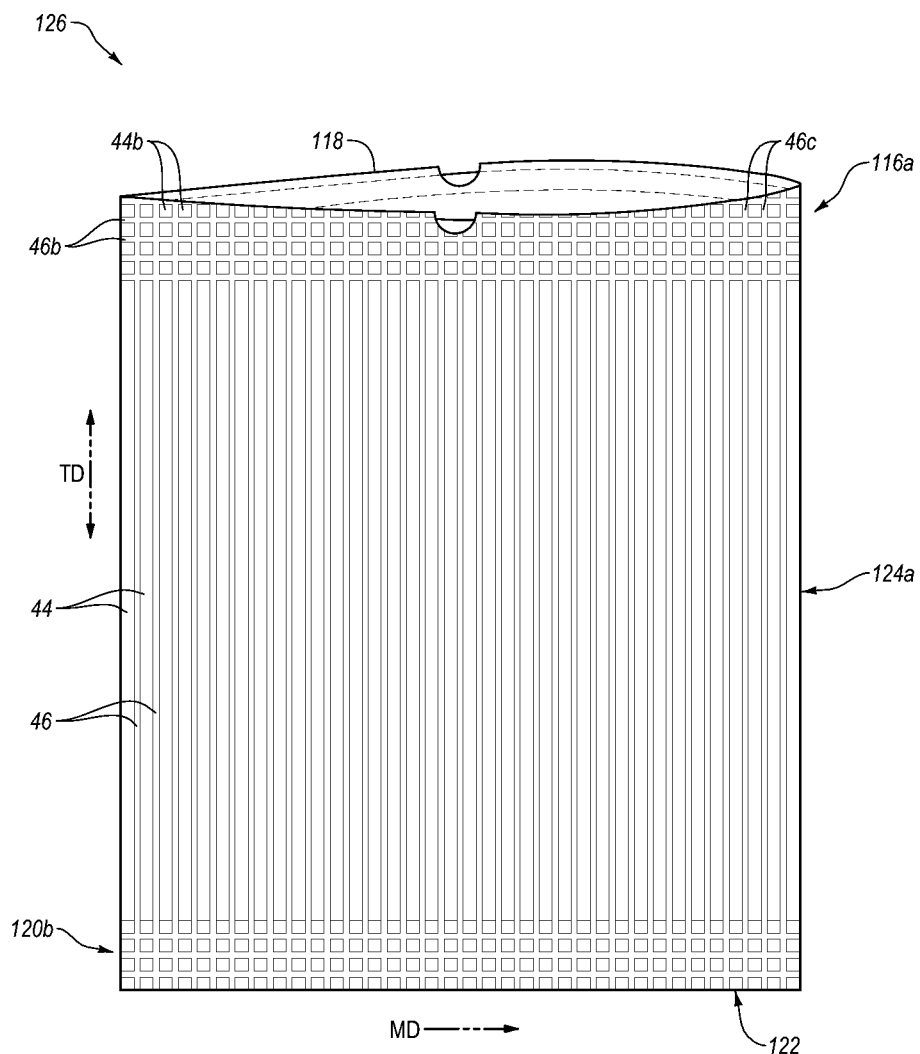
FIG. 14 illustrates a bag incorporating a film with regions that are MD- and TD-incrementally stretched, and regions that are only MD-incrementally stretched in accordance with one or more implementations of the present invention.

FIG. 14 illustrates yet another bag 126 including having an upper section 116*a* adjacent a top edge 118 that includes alternating series of thicker ribs or un-stretched regions 44*b* and thinner ribs 46*b*, 46*c* created by MD and TD ring rolling similar to the film 10*d* of FIG. 9. Furthermore, the middle section 124*a* of the bag 126 can include thicker ribs 44 and thinner ribs 46 created by MD ring rolling. As shown, the middle section 124*a* is devoid of ribs extending in the machine direction.

Thus, one will appreciate in light of the disclosure herein that a manufacturer can tailor specific sections or zones of a bag or film with desirable properties by MD ring rolling, TD ring rolling, or a combination thereof. One region of the bag may include a first type of incremental stretching to increase the MD tear resistance and the TD tear resistance, while a second region includes a second type of incremental stretching designed to reduce gauge and maintain the MD and/or TD tear resistance. Thus, a manufacturer can provide any region of a bag with the different incrementally stretched films and their associated properties described herein above. Furthermore, the different ribbed patterns regions can serve to notify a consumer of the properties of the different sections.

Figure 15:
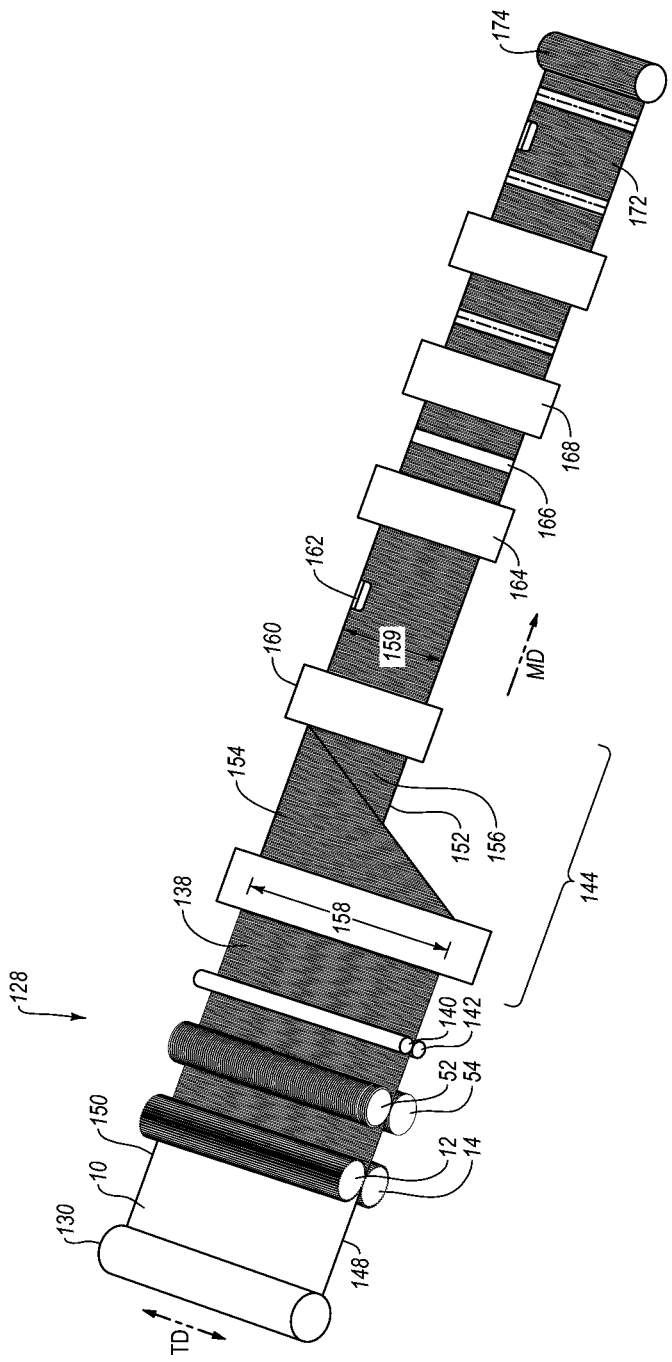
FIG. 15 illustrates a schematic diagram of a bag manufacturing process in accordance with one or more implementations of the present invention.

FIG. 15 illustrates an exemplary embodiment of a high-speed manufacturing process 128 for incrementally stretching a thermoplastic film in one or more of the machine direction and the transverse direction and producing a plastic bag there from. According to the exemplary process, an un-stretched thermoplastic film 10 is unwound from a roll 130 and directed along a machine direction. The un-stretched film 10 can pass between one or more pairs of cylindrical intermeshing rollers to incrementally stretch the un-stretched film 10 and impart a ribbed pattern thereon. For example, FIG. 15 illustrates that the un-stretched film 10 can pass through a first pair of MD intermeshing rollers 12, 14 and a second pair of TD intermeshing rollers 52, 54. In alternative implementations, the un-stretched film 10 can pass through only MD intermeshing rollers 12, 14, only TD intermeshing rollers 52, 54, or through TD intermeshing rollers 52, 54 and then MD intermeshing rollers 12, 14.

The rollers 12, 14, 52, 54 may be arranged so that their longitudinal axes are perpendicular to the machine direction. Additionally, the rollers 12, 14, 52, 54 may rotate about their longitudinal axes in opposite rotational directions. In various embodiments, motors may be provided that power rotation of the rollers 12, 14, 52, 54 in a controlled manner. As the un-stretched film passes between the rollers 12, 14, 52, 54, the ridges of the intermeshing rollers can impart a ribbed pattern and incrementally stretch the film, thereby creating an incrementally-stretched film 138 (i.e., one of films 10b, 10c, 10d, or other MD and/or TD incrementally stretched films).

During the manufacturing process 128, the incrementally-stretched film 138 can also pass through a pair of pinch rollers 140, 142. The pinch rollers 140, 142 can be appropriately arranged to grasp the incrementally-stretched film 138. The pinch rollers 140, 142 may facilitate and accommodate the incrementally-stretched film 138.

A folding operation 144 can fold the incrementally-stretched film 138 to produce the sidewalls of the finished bag. The folding operation 144 can fold the incrementally-stretched film 138 in half along the transverse direction. In particular, the folding operation 144 can move a first edge 148 adjacent to a second edge 150, thereby creating a folded edge 152. The folding operation 144 thereby provides a first film half 154 and an adjacent second web half 156. The overall width 159 of the second film half 156 can be half the second width 158 of the first film half 154 of the incrementally-stretched film 138.

To produce the finished bag, the processing equipment may further process the folded incrementally-stretched film 138. In particular, a draw tape operation 160 can insert a draw tape 162 into the incrementally-stretched film 138. Furthermore, a sealing operation 164 can form the parallel side edges of the finished bag by forming heat seals 166 between adjacent portions of the folded incrementally-stretched film 138. The heat seals 166 may be spaced apart along the folded incrementally-stretched film 138. The sealing operation 164 can form the heat seals 166 using a heating device, such as, a heated knife.

A perforating operation 168 may form a perforation in the heat seals 166 using a perforating device, such as, a perforating knife. The perforations in conjunction with the folded outer edge 152 can define individual bags 172 that may be separated from the incrementally-stretched film 138. A roll 174 can wind the incrementally-stretched film 138 embodying the finished bags 172 for packaging and distribution. For example, the roll 172 may be placed into a box or bag for sale to a customer.

In still further implementations, the folded incrementally-stretched film 138 may be cut into individual bags along the heat seals 166 by a cutting operation. In another implementation, the folded incrementally-stretched film 138 with may be folded one or more times prior to the cutting operation. In yet another implementation, the side sealing operation 164 may be combined with the cutting and/or perforation operations 168.

Figure 16:
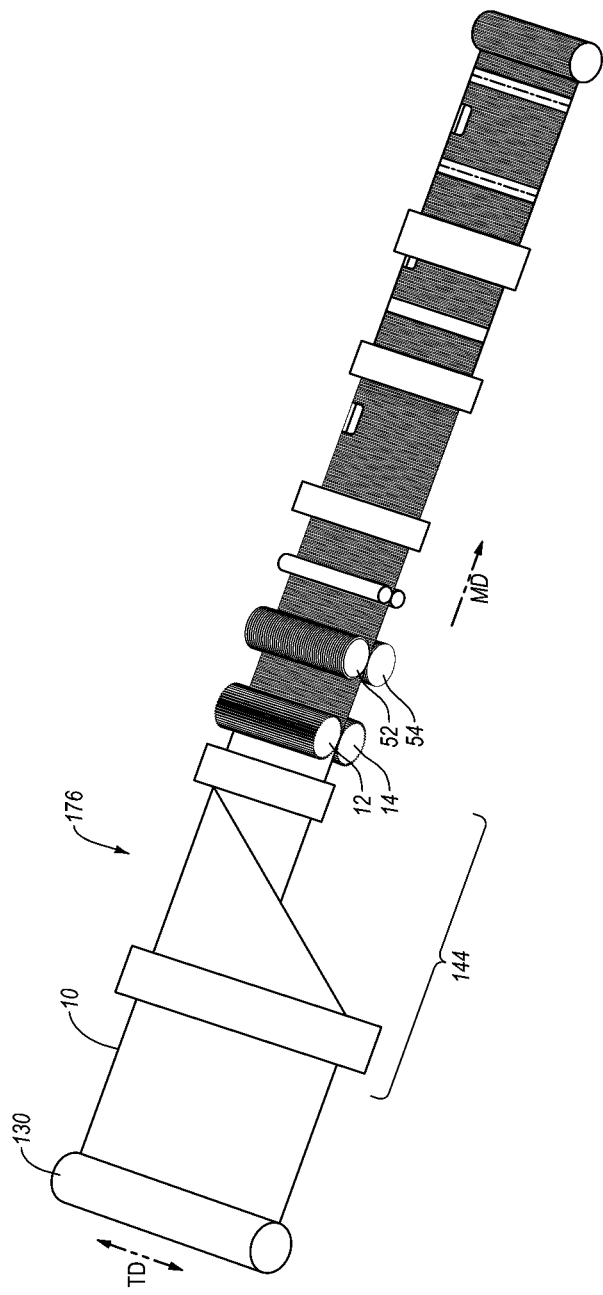
FIG. 16 illustrates a schematic diagram of another bag manufacturing process in accordance with one or more implementations of the present invention.

One will appreciate in light of the disclosure herein that the process 128 described in relation to FIG. 15 can be modified to omit or expanded acts, or vary the order of the various acts as desired. For example, FIG. 16 illustrates another manufacturing process 176 for producing a plastic bag having a ribbed pattern imparted therein. The process 176 can be similar to process 128 of FIG. 15, except that the un-stretched film 10 is stretched by intermeshing rollers 134, 136 after the folding operation 144 has folded the un-stretched film 10 in half.

Figure 17:
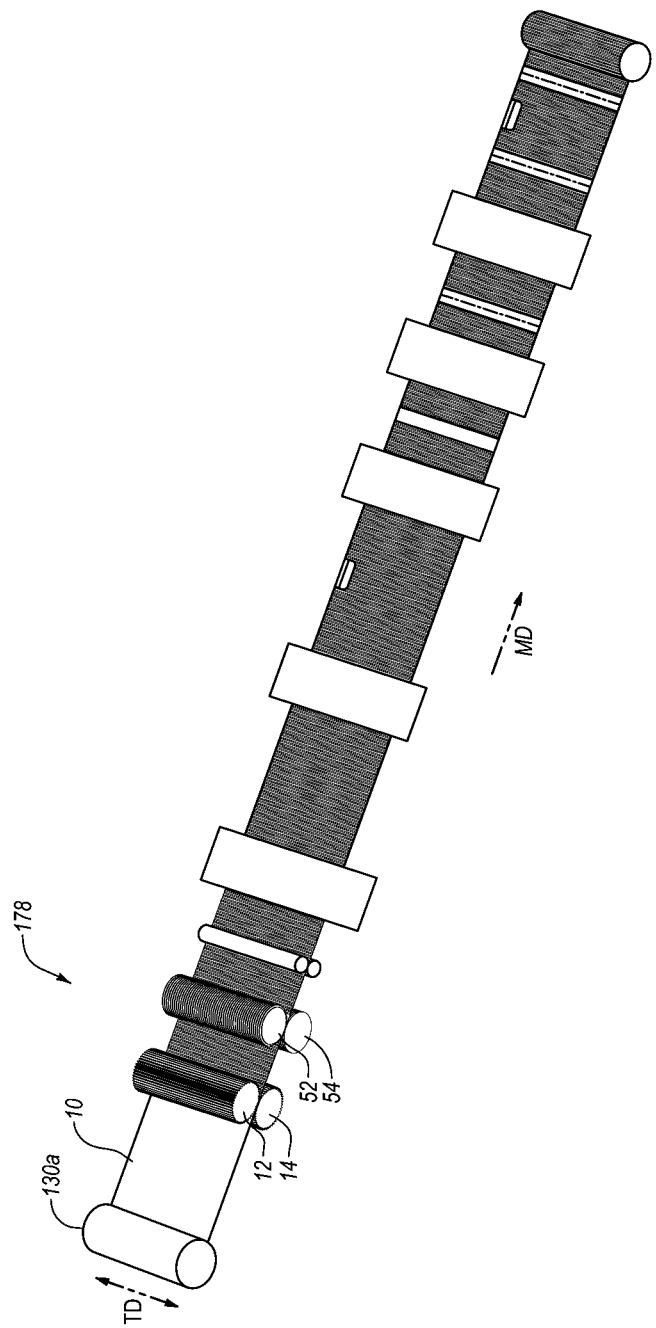
FIG. 17 illustrates a schematic diagram of yet another bag manufacturing process in accordance with one or more implementations of the present invention.

FIG. 17 illustrates yet another manufacturing process 178 for producing a plastic bag having a ribbed pattern imparted therein. The process 178 can be similar to process 128 of FIG. 15, except that the un-stretched film 10 is folded prior to winding it on the roll 130a. Thus, in such implementations, the un-stretched film 10 unwound from the roll 130a is already folded.

Implementations of the present invention can also include methods of incrementally stretching a film of thermoplastic material in the machine direction without reducing the machine-direction tear resistance of the film. The following describes at least one implementation of a method with reference to the components and diagrams of FIGS. 1A through 8. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

For example, one method in accordance with one or more implementations of the present invention can include providing a film of thermoplastic material 10. For example, the method can involve extruding a film 10 and directing the film 10 into a high speed manufacturing system. The film 10 of thermoplastic material can have a first MD tear resistance. In some implementations, the film 10 can have a substantially uniform starting gauge 42.

The method can also include cold stretching the film 10 incrementally in the machine direction. In one or more implementations this can involve imparting a pattern 36 of alternating thick 44 and thin ribs 46 into the film 10. For example, the method can involve MD ring rolling the film 10. More specifically, the method can involve passing the film 10 through intermeshing rollers 12, 14. As the film 10 passes through the intermeshing rollers 12, 14, ridges 24, 26 extending in the transverse direction can impart the pattern 36 into the film and incrementally stretch the film 10 in the machine direction.

The method can also include selecting an MD DOE to pitch ratio of the intermeshing rollers 12, 14 based on one or more material properties of the film 10. For example, the method can involve selecting an MD DOE to pitch ratio based on a starting gauge 42 of the film 10. Additionally or alternatively, the method can involve selecting an MD DOE to pitch ratio based on a BUR used to form the film 10. Optionally, the method can also involve selecting an MD DOE to pitch ratio based on the thermoplastic material of the film 10. In any event, the incrementally cold stretched film 10b can have a second machine-direction tear resistance that is equal to or greater than the first machine-direction tear resistance.

Accordingly, FIGS. 1A-8 and the corresponding text, therefore, specifically show, describe, or otherwise provide a number of systems, components, apparatus, and methods for stretching a film in the machine direction. These apparatus and methods can stretch films as discussed that, at the very least, avoid, reducing the film's MD tear resistance. There are several advantages associated with MD incrementally stretching a thermoplastic film in accordance with one or more implementations of the present invention. First, MD incrementally stretching a film can reduce the amount of thermoplastic material needed to produce a film of certain dimensions. Manufacturers can decrease the cost of their products if they use less thermoplastic material in their products. Depending on the amount that a film is stretched, this cost savings can be significant.

Second, the ribbed pattern 36 that is imparted onto an incrementally stretched film 10b can make the film feel more durable to consumers. This can be important because consumers of products made in whole or in part from a thermoplastic film often associate the strength of a film with its feel. If a film feels thin or insubstantial, consumers may believe that the film is weak and fragile.

Third, if a thermoplastic film is incrementally stretched in the machine direction in accordance with the present invention, the film's MD tear resistance can be maintained or even increased. This finding is unexpected, as it is generally understood that MD stretching a thermoplastic film will decrease the film's MD resistance to tear (i.e., make the film more susceptible to MD tear). Indeed, in one or more implementations the MD tear resistance of a thermoplastic film can be maintained or increased despite the reduction in gauge. In one or more implementations, the MD tear resistance of the MD incrementally-stretched film 10b can be approximately equal to the MD tear resistance of the un-stretched film 10.

In alternative implementations, the MD tear resistance of the MD incrementally-stretched film 10b can be greater than the MD tear resistance of the un-stretched film 10. More specifically, the MD tear resistance of the MD incrementally-stretched film 10b can be approximately 1.0 to approximately 2.0 times greater than the MD tear resistance of the un-stretched film 10. In further implementations, the MD tear resistance of the MD incrementally-stretched film 10b can be approximately 1.1 to about 1.6 times greater than the MD tear resistance of the un-stretched film 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A thermoplastic bag, comprising:
   first and second sidewalls comprising a blown incrementally-stretched thermoplastic film formed by stretching an un-incrementally-stretched thermoplastic film; and
   a first set of alternating thicker and thinner linear ribs extending across the first sidewall in a direction in which the incrementally-stretched thermoplastic film was extruded;
   wherein the blown incrementally-stretched thermoplastic film has a machine direction tear resistance that is approximately equal to or greater than a first machine direction tear resistance of the un-incrementally-stretched thermoplastic film;
   wherein the blown incrementally-stretched thermoplastic film comprises a transverse direction tear resistance that is reduced by a first percent reduction compared to a first transverse direction tear resistance of the un-incrementally-stretched thermoplastic film;
   wherein the blown incrementally-stretched thermoplastic film comprises a gauge by weight reduced by a second percent reduction compared to a first gauge by weight of the un-incrementally-stretched thermoplastic film;
   wherein the first percent reduction of the transverse direction tear resistance is less than the second percent reduction of the gauge by weight.

2. The thermoplastic bag as recited in claim 1, wherein the blown incrementally-stretched thermoplastic film comprises linear low-density polyethylene.

3. The thermoplastic bag as recited in claim 1, wherein a portion of the first sidewall is devoid of alternating thicker and thinner linear ribs extending in the direction in which the incrementally-stretched thermoplastic film was extruded.

4. The thermoplastic bag as recited in claim 1, wherein the blown incrementally-stretched thermoplastic film comprises a gauge by weight is between about 0.70 and about 0.80 times the first gauge by weight of the un-incrementally-stretched thermoplastic film.

5. The thermoplastic bag as recited in claim 1, wherein:
   the transverse direction tear resistance of the blown incrementally-stretched thermoplastic film is about 82 percent of the first transverse direction tear resistance of the un-incrementally-stretched thermoplastic film; and
   the gauge by weight of the blown incrementally-stretched thermoplastic film is about 71 percent of the first gauge by weight of the un-incrementally-stretched thermoplastic film.

6. The thermoplastic bag as recited in claim 1, wherein the machine direction tear resistance of the blown incrementally-stretched thermoplastic film is greater than the first machine direction tear resistance of the un-incrementally-stretched thermoplastic film.

7. The thermoplastic bag as recited in claim 6, wherein the machine direction tear resistance of the blown incrementally-stretched thermoplastic film is between about 1.25 and 2.2 times greater than the first machine direction tear resistance of the un-incrementally-stretched thermoplastic film.

8. A thermoplastic bag, comprising:
   a first thermoplastic sidewall including a blown incrementally-stretched thermoplastic film formed by stretching an un-incrementally-stretched thermoplastic film, wherein the blown incrementally-stretched thermoplastic film:
     comprises a first set of alternating thicker and thinner linear ribs extending across the blown incrementally-stretched thermoplastic film of the first thermoplastic sidewall in a direction in which the blown incrementally-stretched thermoplastic film was extruded;
     comprises a second set of alternating thicker and thinner linear ribs extending across the blown incrementally-stretched thermoplastic film of the first thermoplastic sidewall in a direction transverse to the direction in which the blown incrementally-stretched thermoplastic film was extruded; and
     has a machine direction tear resistance that is greater than a first machine direction tear resistance of the un-incrementally-stretched thermoplastic film; and
   a second thermoplastic sidewall joined to the first thermoplastic sidewall along at least three edges,
   wherein the blown incrementally-stretched thermoplastic film comprises a gauge by weight between about 0.65 and about 0.95 times a first gauge by weight of the un-incrementally-stretched thermoplastic film.

9. The thermoplastic bag as recited in claim 8, wherein the blown incrementally-stretched thermoplastic film of the first thermoplastic sidewall comprises a gauge by weight between about 0.70 and about 0.92 times a first gauge by weight of the un-incrementally-stretched thermoplastic film.

10. The thermoplastic bag as recited in claim 9, wherein the gauge by weight of the blown incrementally-stretched thermoplastic film of the first thermoplastic sidewall is between about 0.70 and 0.80 times the first gauge by weight of the un-incrementally-stretched thermoplastic film.

11. The thermoplastic bag as recited in claim 9, wherein the machine direction tear resistance of the blown incrementally-stretched thermoplastic film of the first thermoplastic sidewall is between about 1.25 and 2.2 times greater than the first machine direction tear resistance of the un-incrementally-stretched thermoplastic film.

12. The thermoplastic bag as recited in claim 8, wherein the blown incrementally-stretched thermoplastic film of the first thermoplastic sidewall comprises one or more of polyethylene or polypropylene.

13. The thermoplastic bag as recited in claim 12, wherein the blown incrementally-stretched thermoplastic film comprises linear low-density polyethylene.

14. The thermoplastic bag as recited in claim 8, wherein:
a first portion of the first thermoplastic sidewall comprises:
the first set of alternating thicker and thinner linear ribs extending across the first thermoplastic sidewall in the direction in which the blown incrementally-stretched thermoplastic film was extruded; and
the second set of alternating thicker and thinner linear ribs extending across the first thermoplastic sidewall in the direction transverse to the direction in which the blown incrementally-stretched thermoplastic film was extruded; and a second portion of the first thermoplastic sidewall comprises one of:

the first set of alternating thicker and thinner linear ribs extending across the first thermoplastic sidewall in the direction in which the blown incrementally-stretched thermoplastic film was extruded; and the second set of alternating thicker and thinner linear ribs extending across the first thermoplastic sidewall in the direction transverse to the direction in which the blown incrementally-stretched thermoplastic film was extruded.

* * * * *